US012809050B2

(12) United States Patent
Wang et al.

(10) Patent No.: US 12,809,050 B2
(45) Date of Patent: Nov. 24, 2026

(54) DIRECT DETERMINATION OF FORMATION APPARENT CONDUCTIVITY FROM EM PROPAGATION MEASUREMENTS

(71) Applicant: SCHLUMBERGER TECHNOLOGY CORPORATION, Sugar Land, TX (US)

(72) Inventors: Gong Li Wang, Sugar Land, TX (US); Dean M. Homan, Sugar Land, TX (US); Kong Hauw Sarwa Bakti Tan, Sugar Land, TX (US); Xiaoyan Zhong, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/100,333

(22) PCT Filed: Jul. 25, 2023

(86) PCT No.: PCT/US2023/070908
§ 371 (c)(1),
(2) Date: Jan. 31, 2025

(87) PCT Pub. No.: WO2024/030779
PCT Pub. Date: Feb. 8, 2024

(65) Prior Publication Data

US 2026/0009924 A1 Jan. 8, 2026

Related U.S. Application Data

(60) Provisional application No. 63/369,978, filed on Aug. 1, 2022.

(51) Int. Cl.

| | |
|---|---|
| ***G01V 3/30*** | (2006.01) |
| ***E21B 49/00*** | (2006.01) |
| ***G01V 3/38*** | (2006.01) |

(52) U.S. Cl.
CPC .................. *G01V 3/30* (2013.01); *G01V 3/38* (2013.01); *E21B 49/00* (2013.01)

(58) Field of Classification Search
CPC ............. G01V 3/30; G01V 3/38; E21B 49/00
See application file for complete search history.

(56) References Cited

U.S. PATENT DOCUMENTS 4,899,112 A 2/1990 Clark et al.
5,329,448 A * 7/1994 Rosthal .................... G01V 3/28
702/7

(Continued)

FOREIGN PATENT DOCUMENTS

WO 2021202572 A1 10/2021
WO 2022056147 A1 3/2022

OTHER PUBLICATIONS

Zhou, CN-106019386, English Translation (Year: 2016).*

(Continued)

*Primary Examiner* — Catherine T. Rastovski
*Assistant Examiner* — Sharah Zaab
(74) *Attorney, Agent, or Firm* — Jeffrey D. Frantz

(57) ABSTRACT

A method for estimating an apparent conductivity of a subterranean formation includes acquiring at least first and second electromagnetic propagation measurements made using an electromagnetic propagation tool having at least one transmitting antenna spaced apart from at least one receiving antenna. A ratio is computed using the measurements and further evaluated to estimate the apparent conductivity.

15 Claims, 14 Drawing Sheets

(56) References Cited

U.S. PATENT DOCUMENTS

| | | | | |
|---|---|---|---|---|
| 7,327,145 | B2 | 2/2008 | Haugland | |
| 7,414,391 | B2 | 8/2008 | Homan et al. | |
| 7,536,261 | B2 | 5/2009 | Omeragic et al. | |
| 7,656,160 | B2 | 2/2010 | Legendre et al. | |
| 7,755,361 | B2 | 7/2010 | Seydoux et al. | |
| 8,193,813 | B2 | 6/2012 | Seydoux et al. | |
| 8,466,683 | B2 | 6/2013 | Legendre et al. | |
| 8,736,270 | B2 | 5/2014 | Seydoux et al. | |
| 9,134,449 | B2 | 9/2015 | Seydoux et al. | |
| 9,835,753 | B2 | 12/2017 | Frey et al. | |
| 9,835,755 | B2 | 12/2017 | Frey et al. | |
| 10,371,852 | B2 | 8/2019 | Homan et al. | |
| 10,935,690 | B2 | 3/2021 | Wu | |
| 2003/0163258 | A1* | 8/2003 | Haugland | G01V 3/30 702/6 |
| 2012/0143509 | A1 | 6/2012 | G. | |
| 2015/0032376 | A1* | 1/2015 | Hou | G01V 3/26 702/7 |
| 2015/0276973 | A1 | 10/2015 | Frey | |
| 2019/0086575 | A1 | 3/2019 | Fouda et al. | |
| 2021/0041592 | A1* | 2/2021 | Wilson | G01V 3/38 |

OTHER PUBLICATIONS

Sinclair, KR-900000625, English Translation (Year: 1990).*

International Search Report and Written Opinion of International Patent Application No. PCT/US2023/070908 dated on Nov. 7, 2023, 11 pages.

* cited by examiner

DIRECT DETERMINATION OF FORMATION APPARENT CONDUCTIVITY FROM EM PROPAGATION MEASUREMENTS

CROSS REFERENCE TO RELATED APPLICATIONS

This application is a National Stage Entry of International Application No. PCT/US2023/070908, filed on Jul. 25, 2023, which claims priority to U.S. Provisional Patent Application No. 63/369,978, which was filed on Aug. 1, 2022, and is incorporated herein by reference in its entirety.

BACKGROUND

Electromagnetic logging measurements are commonly made in oilfield operations. Such measurements may provide formation resistivity and dielectric properties as well as information about remote geological features (e.g., remote beds, bed boundaries, and/or fluid contacts) not intercepted by the measurement tool. This information may be used to evaluate the water saturation and potential hydrocarbon bearing capacity of the formation as well as to provide information for steering the direction of drilling (e.g., in a geosteering operation).

Electromagnetic propagation tools normally measure a voltage ratio at two distinct receivers. The two receivers can be spaced apart on a tool collar or collocated but having different moments. In practice, the voltage ratio is often converted to and recorded in the form of phase shift and attenuation. The phase shift and attenuation raw measurement data are then further processed to compute formation resistivity. A resistivity transform is a common and widespread method to compute the formation resistivity. Such a transform is essentially an inversion processing technique that assumes a homogeneous formation. Fundamental resistivity logs are commonly generated with this technique for electromagnetic propagation tools.

While use of a resistivity transform and other inversion techniques provide a suitable indication of formation resistivity in many logging operations, there is room for further improvement. For example, the use of the resistivity transform can obscure the underlying physics of the measurements, making it difficult to understand and interpret the behavior of the logs. Moreover, inversion techniques are commonly computationally intensive and time consuming and are limited by model assumptions regarding the formation. There is a need in the art for methods of estimating formation resistivity without the use of a resistivity transform or inversion processing techniques.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
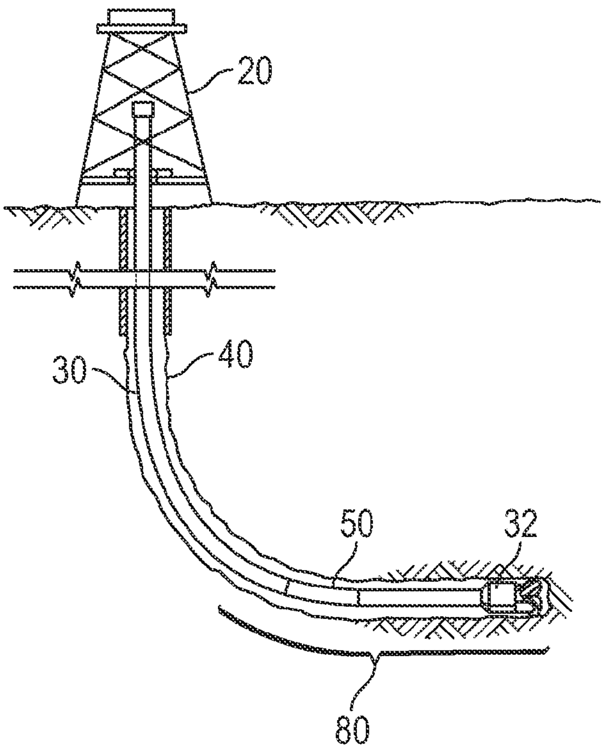
FIG. 1 depicts an example drilling system including a disclosed electromagnetic (EM) propagation tool.

A method is disclosed for estimating an apparent conductivity of a subterranean formation. The method includes acquiring at least first and second electromagnetic propagation measurements made using an electromagnetic propagation tool having at least one transmitting antenna spaced apart from at least one receiving antenna. A ratio is computed using the measurements and further evaluated to compute the apparent conductivity.

It will be appreciated that the term apparent conductivity is widely used in the industry (and has been for decades). The conductivity is referred to as "apparent" because it may not be exactly the same as the actual (or true) conductivity. Differences between apparent conductivity and true conductivity may be the result, for example, of the skin-effect, remote bed boundaries, and/or other heterogeneities in the formation.

The disclosed methods advantageously process ratios of EM propagation measurements to estimate an apparent formation conductivity and/or apparent formation resistivity without using an inversion or a resistivity transform. In particular, the disclosed processing techniques make use of a derived tool constant that is related to a measurement frequency and a spacing distance between the transmitting antennas and the receiving antennas used to make the propagation measurements. The disclosed tool constant and the estimated apparent conductivity and/or the apparent resistivity may be used to generate apparent conductivity and/or apparent resistivity well logs. In some embodiments, the apparent conductivity may be a phase shift apparent conductivity and/or an attenuation apparent conductivity. Moreover, advantageous embodiments may compute a sum of a phase shift apparent conductivity and an attenuation apparent conductivity to compute a skin-effect corrected apparent conductivity that may provide an accurate representative of the true formation conductivity.

By eliminating (obviating) the need to use inversion techniques, the disclosed embodiments may further advantageously significantly reduce the computational requirements needed to determine formation conductivity. Moreover, as described in more detail below, the formation conductivities (referred to as apparent conductivities herein) may be computed using relatively simple analytical expressions such that the apparent conductivities may be directly computed using a low power processor. In example embodiments, the apparent conductivities may be advantageously computed using a processor located downhole in the propagation tool.

EM propagation measurements may be made by electromagnetically coupling an EM transmitting antenna and one or more receiving antennas. Propagation logging measurements enable formation resistivity to be estimated via measuring the propagation effect of the EM field (i.e., the phase shift and attenuation of the electromagnetic field). The propagation effect is detectable when the propagation constant or the induction number, namely the ratio of the spacing distance L (the square of the distance between transmitter and receiver) and the skin depth δ is sufficiently large. Commercial propagation measurements are commonly made at relatively high frequencies (e.g., at 400 kHz and 2 MHz) where the skin depth δ is small and the propagation constant is sufficient large that the phase shift and attenuation can be accurately measured. Deep EM measurements made at lower frequencies (e.g., in a range from 1 kHz to 100 kHz) may also have a sufficiently large propagation constant (owing to the large spacing distance between the transmitters and receivers) that the phase shift and attenuation can also be accurately measured. The embodiments disclosed herein may be particularly well suited for such deep EM measurements.

As is known to those of ordinary skill in the art, coupling an EM transmitting antenna and one or more receiving antennas may be accomplished by applying a time varying electrical current (an alternating current at a propagation frequency) in the transmitting antenna to transmit EM energy into the surrounding environment (including the formation). This is referred to as "firing" the transmitter. The transmitted energy generates a corresponding time varying magnetic field in the local environment (e.g., in the tool collar, borehole fluid, and formation). The magnetic field in turn induces electrical currents (eddy currents) in the conductive formation. These eddy currents further produce secondary magnetic fields which may produce a voltage response in a receiving antenna (the EM energy is received, for example, via measuring the complex-valued voltage in the receiving antenna). Therefore, in example embodiments, acquiring electromagnetic propagation measurements may be understood to mean firing a transmitting antenna and receiving corresponding voltages at first and second collocated receiving antennas (e.g., while rotating in a wellbore).

A propagation measurement includes a logarithm of a ratio of at least first and second voltage measurements, for example, as follows: $AT+iPS=\ln(V_1/V_2)$ where $V_1$ and $V_2$ represent first and second voltage measurements obtained from first and second distinct transmitter receiver couplings, and PS and AT represent the phase shift and attenuation of the EM field. Those of ordinary skill in the art will readily appreciate that such measurements are commonly made while rotating and translating an EM propagation tool in a wellbore to obtain a plurality of measurements made at a plurality of corresponding measured depths. The measurements may be plotted versus measured depth to generate a log or versus measured depth and toolface angle to generate an image.

FIG. 1 depicts a schematic drilling rig 20 including a drill string 30 and an example electromagnetic (EM) propagation tool 50 deployed in the string 30 and disposed within a wellbore 40. The drilling rig 20 may be deployed in either onshore or offshore applications (an onshore application is depicted). In this type of system, the wellbore 40 may be formed in subsurface formations by rotary drilling in a manner that is well-known to those of ordinary skill in the art (e.g., via well-known directional drilling techniques).

In the illustrated embodiment, the EM propagation tool 50 may be deployed in a bottom hole assembly (BHA) 80 and may include a processor configured to execute the disclosed method embodiments. The BHA 80 may further include, for example, a rotary steerable system (RSS), a motor, drill bit 32, a measurement while drilling (MWD) tool, and/or one or more other logging-while-drilling (LWD) tools. The other LWD tools may be configured to measure one or more properties of the formation through which the wellbore penetrates, for example, including NMR relaxation times, density, porosity, sonic velocity, gamma ray counts, and the like. A suitable MWD tool may be configured to measure one or more properties of the wellbore 40 as it is drilled or at any time thereafter. The physical properties may include, for example, pressure, temperature, wellbore caliper, wellbore trajectory (attitude), a toolface angle, and the like.

It will, of course, be understood that the disclosed embodiments are not limited to any particular BHA configuration. Nor are they limited to any particular type of drilling operation. Moreover, the disclosed embodiments are not limited to logging while drilling applications (as depicted on FIG. 1) but may also be implemented in wireline logging applications.

Figure 2:
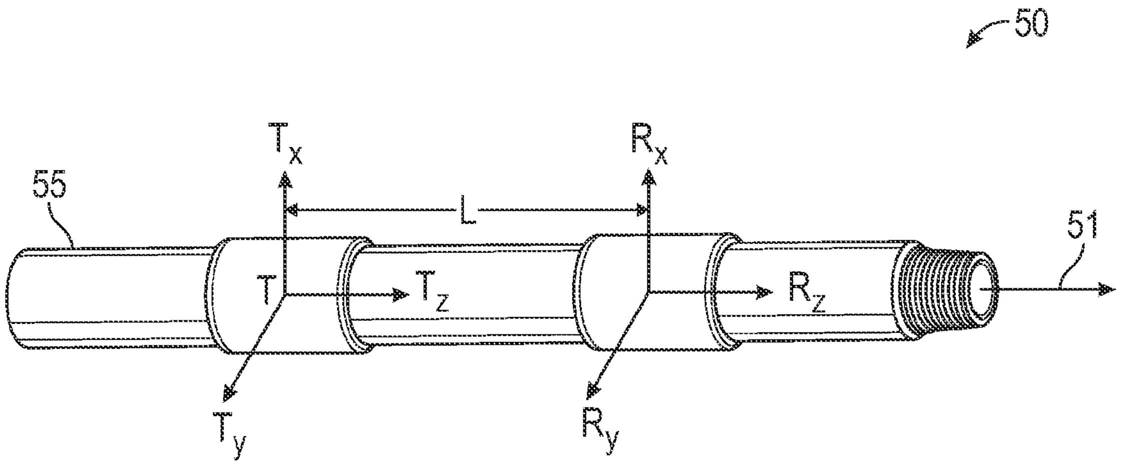
FIG. 2 depicts one example embodiment of a disclosed EM propagation tool.

FIG. 2 depicts one example embodiment of EM propagation tool 50. In the depicted example embodiment, the tool 50 includes a transmitter T and a receiver R axially spaced apart from one another on tool collar 55 (by a spacing distance L). While the disclosed embodiments are particularly well suited for deep reading EM measurements, those of ordinary skill will readily recognize that substantially any suitable transmitter and receiver spacing may be utilized to achieve a desired measurement depth. By deep reading it is meant that the spacing distance L is greater than 3 meters (e.g., greater than 5 meters, greater than 10 meters, or greater than 20 meters). Moreover, it will be understood that while not depicted, the propagation tool 50 may include multiple transmitters and receivers spaced apart on the tool body, thereby enabling multiple propagation measurements (or sets of propagation measurements) to be made at multiple spacing distances (e.g., at spacing distances up to and exceeding 10, 20, or 30 meters).

In example embodiments, the transmitter T and receiver R may each include a triaxial antenna arrangement (e.g., three mutually orthogonal antennas including an axial antenna and first and second transverse antennas that are orthogonal to one another in this particular embodiment). For example, the transmitter and receiver may include three collocated triaxial antennas having mutually orthogonal moments $T_x$, $T_y$, $T_z$ and $R_x$, $R_y$, $R_z$ that are aligned with corresponding x-, y-, and z-directions (axes) in the wellbore or tool reference frames. By collocated it is meant that the axial spacing of the antenna moments is less than the diameter of the tool collar on which they are deployed. While the disclosed embodiment depicts a configuration in which the z-direction is aligned with the tool axis 51, it will be understood that the disclosed embodiments are not limited to any particular coordinate system or any particular orientation of the coordinate system (e.g., any particular orientation of the x-, y-, and z-axes on the tool).

The transmitter T and receiver R may include known antenna configurations. For example, the $T_z$ and $R_z$ antennas may include conventional axial antenna arrangements. As is known to those of ordinary skill in the art, an axial antenna is one having a moment ($T_z$ and $R_z$ in FIG. 2) that is substantially parallel with the tool/collar axis. Axial antennas are commonly wound about the circumference of the collar 55 such that the plane of the antenna is substantially orthogonal to the tool axis. Likewise, transverse antennas are antennas having moments ($T_x$, $T_y$ and $R_x$, $R_y$ in FIG. 2) that are perpendicular with the tool axis. Such antennas may include conventional transverse antenna arrangements, for example, including saddle coils. While FIG. 2 depicts an example propagation tool embodiment including triaxial antenna arrangements, it will be appreciated that the disclosed methods are not so limited.

It will be further appreciated that the disclosed embodiments may be particularly well suited for use with deep EM propagation measurements. Thus, while not depicted in FIG. 2, it will be understood that for a deep reading EM propagation tool the transmitter T and receiver R may be deployed on corresponding first and second subs (or distinct tool collars) that may be separated by a substantial distance along the length of the BHA 80 (FIG. 1) and that other BHA tools, e.g., including other logging tools, may be deployed between the subs.

Moreover, it will be understood that EM tool 50 may include a controller (including one or more processors) configured to make EM measurements, for example, via firing the transmitting antennas and receiving corresponding voltages at the receiving antennas. The controller/processor may be further configured to process the measurements to compute one or more apparent conductivity values as described in more detail below.

Figure 3:
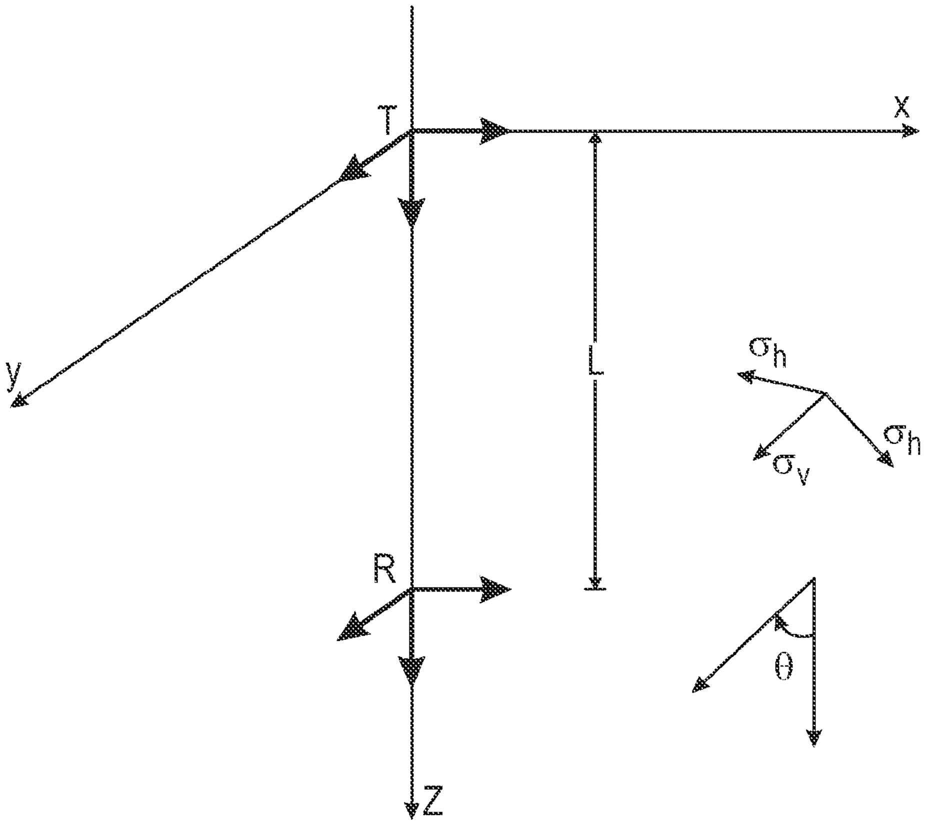
FIG. 3 schematically depicts the EM propagation tool of FIG. 2 deployed in a dipping, transversely-isotropic, homogeneous formation.

With reference now to FIG. 3, the following mathematical analysis considers deployment of an EM propagation tool (e.g., example tool 50) in a dipping, transversely-isotropic, homogeneous formation. The dip angle θ may be defined as the angle between a direction orthogonal to the plane of isotropy (e.g., the formation layers or strata) and the z-axis of the wellbore as depicted. In an electromagnetic measurement context, a transversely-isotropic formation includes vertical and horizontal conductivities $\sigma_v$ and $\sigma_h$ as depicted in which $\sigma_v$ represents a conductivity (e.g., complex conductivity) in a direction orthogonal to the plane of isotropy and $\sigma_h$ represents a conductivity (e.g., complex conductivity) parallel to (or within) the plane of isotropy.

Moreover, the following analysis may further consider a special case in which the x-oriented transmitter and receiver coils are in the plane of relative dip as also depicted on FIG. 3 (note that the plane of relative dip is the plane of the figure). Note also, that this consideration does not require the measurements to be made in this special orientation. The measurements may be made with the tool in any rotational orientation (about the z-axis) and then may be rotated using processing techniques known to those of ordinary skill (e.g., processing the measurements with a rotational transform). At this relative tool/formation orientation the xy, yx, zy, and yz components of the magnetic field tensor are equal to zero owing to the symmetry of induced currents about the plane of relative dip. The five non-zero components of the magnetic field may be expressed mathematically, for example, as follows:

$$H_{xx} = \frac{M}{4\pi L^3} e^{ik_h L}\left[-\left(1 - ik_h L + (ik_h L)^2\right) + ik_h L\left(1 - e^{ik_h L(\xi-1)}\right)\frac{1}{\tan^2\theta}\right] \quad (1)$$

$$H_{yy} = \frac{M}{4\pi L^3} e^{ik_h L}\left[-\left(1 - ik_h L + (ik_h L)^2\right) - ik_h L\left(1 - e^{ik_h L(\xi-1)}\right)\frac{1}{\sin^2\theta} + (ik_h L)^2\left(1 - \frac{\sigma_v}{\sigma_h}\frac{1}{\xi}e^{ik_h L(\xi-1)}\right)\right] \quad (2)$$

-continued $$H_{zz} = \frac{M}{4\pi L^3} e^{ik_h L}\left[2(1 - ik_h L) + ik_h L\left(1 - e^{ik_h L(\xi-1)}\right)\right] \quad (3)$$

$$H_{xz} = \frac{M}{4\pi L^3} e^{ik_h L} ik_h L\left(1 - e^{ik_h L(\xi-1)}\right)\frac{1}{\tan\theta} \quad (4)$$

$$H_{zx} = H_{xz}. \quad (5)$$

In Eqs. (1)-(5), M represents the moment of the transmitter, L represents the spacing between the transmitter and the receiver (as indicated on FIGS. 2 and 3), and θ represents the apparent dip of the formation lamination planes relative to the tool axis. Symbols $k_h$ and $k_v$ represent wavenumbers corresponding to $\sigma_h$ and $\sigma_v$ given by $k_h=\sqrt{i\omega\mu\sigma_h}$ and $k_v=\sqrt{i\omega\mu\sigma_v}$, respectively. Here, ω represents the angular frequency, $\omega=2\pi f$, where $f$ represents the frequency of the applied current I in the transmitter. It is worth noting that $\sigma_h$ and $\sigma_v$ may be complex quantities (indicating both resistive and dielectric properties of the formation). The symbol μ represents the magnetic permeability of the formation. Eq. (5) may be demonstrated using the reciprocal theorem and the symmetry of the formation about the xy-plane. The variable ξ in Eqs. (1)-(4) may be expressed, for example, as follows:

$$\xi = \sqrt{1 + \left(\frac{\sigma_v}{\sigma_h} - 1\right)\sin^2\theta}. \quad (6)$$

With continued reference to Eqs. (1)-(5), it will be understood that the indicated magnetic fields $H_{ij}$ may be equivalently thought of as voltages (or measured voltages), or impedances (or measured impedances) in the corresponding receiver antennas. Likewise, the measurements described below will be understood to be based on ratios of the measured voltages in particular receiving antennas when certain transmitting antennas are fired.

Apparent Conductivities

Figure 4A:
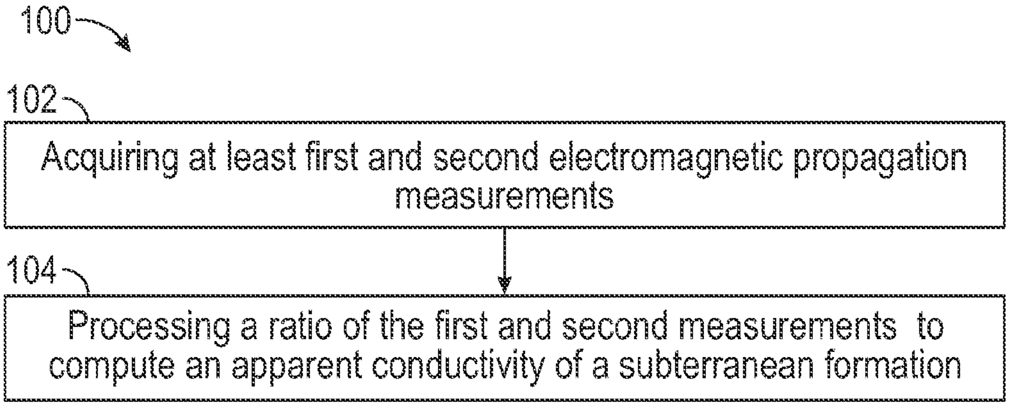
FIGS. 4A and 4B depict flow charts of example methods for estimating an apparent resistivity of a subterranean formation.
Figure 4B:
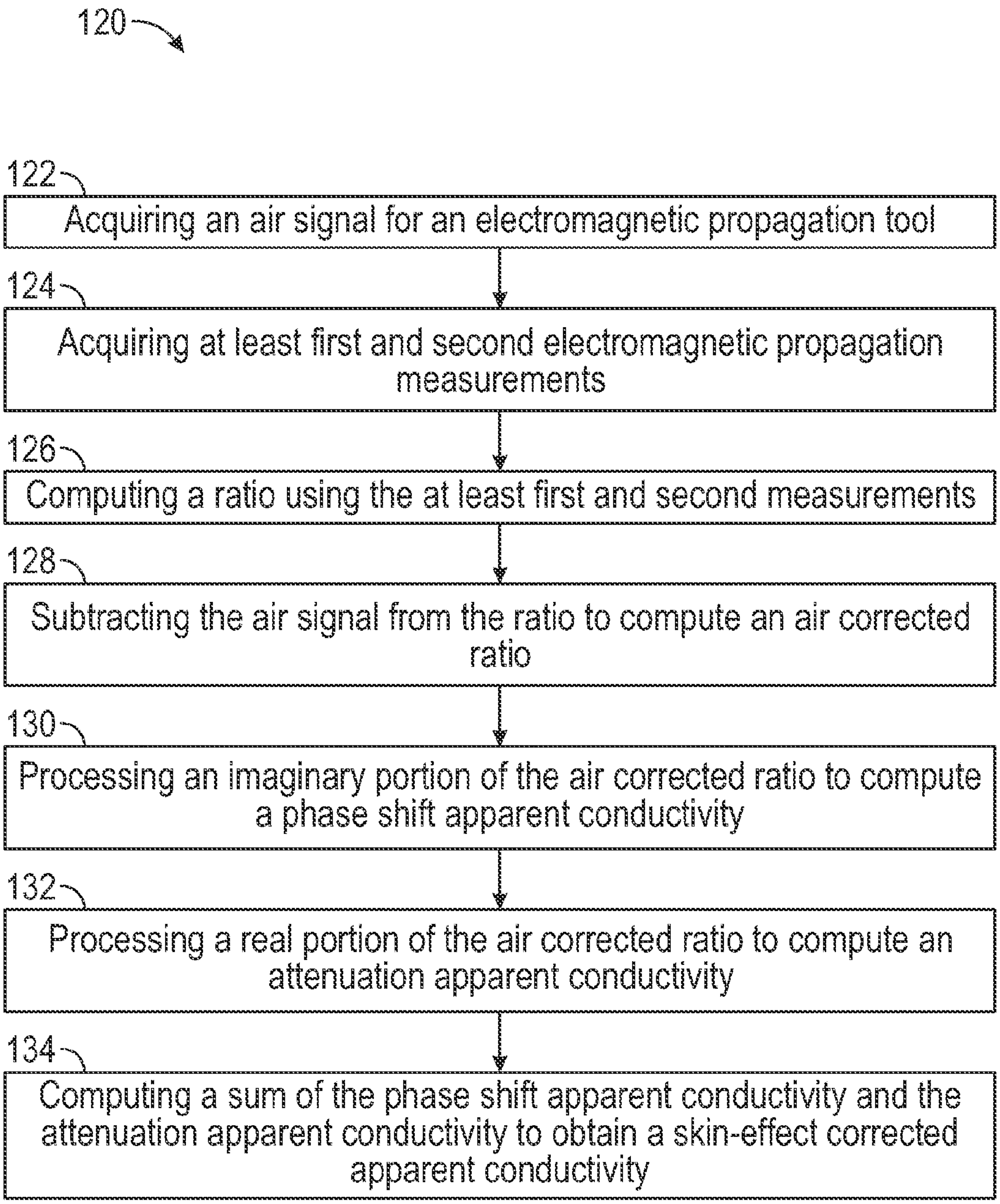

FIGS. 4A and 4B (collectively FIG. 4) depict flow charts of example methods 100 and 120 for making apparent conductivity measurements of a subterranean formation. In FIG. 4A, method 100 includes acquiring at least first and second EM propagation measurements at 102 and processing a ratio of the measurements at 104 to compute an apparent conductivity of the subterranean formation. The first and second EM propagation measurements may be made, for example, using an electromagnetic propagation tool including at least one transmitting antenna spaced apart by a spacing distance from at least one receiving antenna.

In FIG. 4B, method 120 includes acquiring an air signal for an EM propagation tool (such as example EM tool 50 in FIG. 2) at 122. At least first and second EM propagation measurements are acquired at 124 and processed to compute a measurement ratio at 126. The air signal is subtracted from the computed ratio at 128 to obtain an air corrected ratio. An imaginary portion of the air corrected ratio is processed at 130 to compute a phase shift apparent conductivity and a real portion of the air corrected ratio is processed at 132 to compute an attenuation apparent conductivity. The phase shift apparent conductivity and the attenuation apparent conductivity are summed at 134 to compute a skin-effect apparent conductivity.

Mathematical formulas that may be used to compute example apparent conductivities may be derived using the foregoing magnetic field equations (voltages) given in Eqs.

(1)-(5). Apparent conductivities are derived for (i) harmonic resistivity measurements, (ii) harmonic anisotropy measurements, (iii) anti-symmetrized directional measurements, and (iv) symmetrized directional measurements.

Harmonic Resistivity Measurement

The apparent conductivity of a harmonic resistivity measurement may be obtained, for example, as follows. Substituting the coplanar and coaxial couplings in Eqs. (1)-(3) into the expression for the harmonic resistivity measurement, giving the following expression:

$$\ln\frac{-2H_{zz}}{H_{xx}+H_{yy}} = \ln 2\frac{1-\frac{1}{2}ik_hL-\frac{1}{2}ik_hL\,e^{ik_hL(\xi-1)}}{1-\frac{1}{2}ik_hL-\frac{1}{2}ik_hLe^{ik_hL(\xi-1)}+\frac{1}{2}(ik_hL)^2+\frac{1}{2}(ik_vL)^2\frac{1}{\xi}e^{ik_hL(\xi-1)}} \tag{7}$$

When the frequency $f$ is low or the transmitter-receiver spacing L is small, e.g., when $k_hL\to 0$ and $k_vL\to 0$, Eq. (7) may be expressed using the following polynomial expansion:

$$\ln\frac{-2H_{zz}}{H_{xx}+H_{yy}} = \ln 2+\frac{1}{2}\frac{-(ik_hL)^2-(ik_vL)^2\frac{1}{\xi}e^{ik_hL(\xi-1)}}{1-\frac{1}{2}ik_hL-\frac{1}{2}ik_hLe^{ik_hL(\xi-1)}+\frac{1}{2}(ik_hL)^2+\frac{1}{2}(ik_vL)^2\frac{1}{\xi}e^{ik_hL(\xi-1)}} - \frac{1}{2}\left[\frac{1}{2}\frac{(ik_hL)^2-(ik_vL)^2\frac{1}{\xi}e^{ik_hL(\xi-1)}}{1-\frac{1}{2}ik_hL-\frac{1}{2}ik_hLe^{ik_hL(\xi-1)}+\frac{1}{2}(ik_hL)^2+\frac{1}{2}(ik_vL)^2\frac{1}{\xi}e^{ik_hL(\xi-1)}}\right]^2+\dots \tag{8}$$

Eq. (8) may be further expanded as a polynomial in terms of $k_hL$ and $k_vL$. Ignoring the higher order terms, the harmonic resistivity measurement, may be expressed, for example, as follows:

$$\ln\frac{-2H_{zz}}{H_{xx}+H_{yy}} \approx \ln(2)+\frac{1}{2}\left(k_h^2L^2+\frac{1}{\xi}k_v^2L^2\right). \tag{9}$$

The low frequency approximation given in Eq. (9) may be used to define an apparent conductivity. To this end, the air signal may first be removed, for example, as follows (where ln (2) represents the air signal)

$$\ln\frac{-2H_{zz}}{H_{xx}+H_{yy}}\Big|_{ACC} = \ln\frac{-2H_{zz}}{H_{xx}+H_{yy}} - \ln(2). \tag{10}$$

The apparent conductivity of the harmonic resistivity measurement may then be defined, for example, as follows:

$$\sigma_{UHR} \equiv -\frac{i}{K_{UHR}}\ln\frac{-2H_{zz}}{H_{xx}+H_{yy}}\Big|_{ACC} \tag{11}$$

Where ACC indicates that the measurement is air corrected, Kum represents the tool constant for the harmonic resistivity measurement, and where:

$$K_{UHR} \equiv \omega\mu L^2. \tag{12}$$

Note that in Eqs. (11) and (12), the apparent conductivity $\sigma_{UHR}$ is inversely proportional to the tool constant $K_{UHR}$ and therefore to the measurement frequency ω and a square of the spacing distance L.

In Eq. (11), FUHR is a complex quantity (complex-valued) such that:

$$\sigma_{UHR} \equiv \sigma_{UHRP} + i\sigma_{UHRA}, \text{ and} \tag{13}$$

$$\sigma_{UHRP} \equiv +\frac{1}{K_{UHR}}\mathrm{Im}\left[\ln\frac{-2H_{zz}}{H_{xx}+H_{yy}}\Big|_{ACC}\right] \tag{14a}$$

$$\sigma_{UHRA} \equiv -\frac{1}{K_{UHR}}\mathrm{Re}\left[\ln\frac{-2H_{zz}}{H_{xx}+H_{yy}}\Big|_{ACC}\right] \tag{14b}$$

where $\sigma_{UHRP}$ and $\sigma_{UHRA}$ represent the phase shift apparent conductivity and the attenuation apparent conductivity and Im[•] and Re[•] represent imaginary and real portions of the bracketed quantity (e.g., real portions of the voltage ratios).

As described above with respect to Eqs. (1)-(5), the horizontal and vertical conductivities, $\sigma_h$ and $\sigma_v$, may be complex quantities and may be expressed, for example, as follows: $\sigma_h=\sigma_{h,R}+i\sigma_{h,X}$ and $\sigma_v=\sigma_{v,R}+i\sigma_{v,X}$ where $\sigma_{h,X}=-\omega\varepsilon_h$, and $\sigma_{v,X}=-\omega\varepsilon_v$ and $\varepsilon_h$ and $\varepsilon_v$ represent horizontal and vertical dielectric constants. Combining Eqs. (9), (14a), and (14b) and the definitions provided above for $\sigma_h$ and $\sigma_v$ yields the following:

$$\sigma_{UHRP} \approx \frac{1}{2}\left(\sigma_{h,R}+\frac{1}{\xi_\sigma}\sigma_{v,R}\right),\ \sigma_{h,v,R} \gg \omega\varepsilon_{h,v} \tag{15a}$$

$$\sigma_{UHRA} \approx -\frac{1}{2}\left(\omega\varepsilon_h+\frac{1}{\xi_\varepsilon}\omega\varepsilon_v\right),\ \sigma_{h,v,R} \ll \omega\varepsilon_{h,v} \tag{15b}$$

$$\text{where: } \xi_\sigma = \sqrt{1+\left(\frac{\sigma_{v,R}}{\sigma_{h,R}}-1\right)\sin^2\theta}, \tag{16a}$$

$$\xi_\varepsilon = \sqrt{1+\left(\frac{\varepsilon_v}{\varepsilon_h}-1\right)\sin^2\theta}. \tag{16b}$$

Eqs. (15a) and (15b) reduce to the following for an isotropic formation in which $\sigma_{h,R}=\sigma_{v,R}=\sigma_R$ and $\varepsilon_h=\varepsilon_v=\varepsilon$:

$$\sigma_{UHRP} \approx \sigma_R, \tag{17a}$$

$$\sigma_{UHRA} \approx -\omega\varepsilon. \tag{17b}$$

In practice, the harmonic resistivity attenuation and phase shift measurements may be expressed, for example, as follows:

$$UHRA = 20\log_{10}\left\{\frac{-2H_{zz}}{H_{xx}+H_{yy}}\right\}, \tag{18a}$$

$$UHRP = -\text{angle}\left\{\frac{-2H_{zz}}{H_{xx}+H_{yy}}\right\}. \tag{18b}$$

With reference again to Eqs. (14a) and (14b), the following relationships exist between the apparent conductivities and the attenuation and phase shift measurements:

$$\sigma_{UHRA} = -\frac{1}{K_{UHR}}\left(\frac{\ln 10}{20}UHRA - \ln 2\right), \tag{19a}$$

$$\sigma_{UHRP} = -\frac{1}{K_{UHR}}\frac{\pi}{180^\circ}UHRP. \tag{19b}$$

It should be noted that the ln 2 term in Eqs. (10) and (19a) represents a theoretical air signal. The actual air signal of a real tool may differ and can be determined with a measurement (e.g., a well-known air hang test). For such a real tool, the measured air signal may replace the ln 2 term and therefore be subtracted in the two equations.

Harmonic Anisotropy Measurement

The apparent conductivity of a harmonic anisotropy measurement may be obtained, for example, as follows. Substituting the two coplanar couplings given in Eqs. (1) and (2) in the expression for a harmonic resistivity measurement, yields the following expression at a low frequency $f$ or a small transmitter-receiver spacing L:

$$\ln\frac{H_{xx}}{H_{yy}} = \frac{-ik_hL\left(1-e^{ik_hL(\xi-1)}\right)\frac{\cos^2\theta+1}{\sin^2\theta} + (ik_hL)^2\left(1-\frac{\sigma_v}{\sigma_h}\frac{1}{\xi}e^{ik_hL(\xi-1)}\right)}{1-ik_hL+(ik_hL)^2+ik_hL\left(1-e^{ik_hL(\xi-1)}\right)\frac{1}{\sin^2\theta} - (ik_hL)^2\left(1-\frac{\sigma_v}{\sigma_h}\frac{1}{\xi}e^{ik_hL(\xi-1)}\right)} - \frac{1}{2}\left[\frac{-ik_hL\left(1-e^{ik_hL(\xi-1)}\right)\frac{\cos^2\theta+1}{\sin^2\theta} + (ik_hL)^2\left(1-\frac{\sigma_v}{\sigma_h}\frac{1}{\xi}e^{ik_hL(\xi-1)}\right)}{1-ik_hL+(ik_hL)^2+ik_hL\left(1-e^{ik_hL(\xi-1)}\right)\frac{1}{\sin^2\theta} - (ik_hL)^2\left(1-\frac{\sigma_v}{\sigma_h}\frac{1}{\xi}e^{ik_hL(\xi-1)}\right)}\right]^2 + \ldots \tag{20}$$

Eq. (20) may be further expanded as a polynomial in terms of $k_hL$ and $k_vL$. Ignoring the higher order terms, the harmonic anisotropy measurement may be approximated, for example, as follows:

$$\ln\frac{H_{xx}}{H_{yy}} \approx (ik_hL)^2(\xi-1)\frac{\cos^2\theta+1}{\sin^2\theta} + (ik_hL)^2\left(1-\frac{\sigma_v}{\sigma_h}\frac{1}{\xi}\right). \tag{21}$$

Eq. (21) may be expressed alternatively as follows:

$$\ln\frac{H_{xx}}{H_{yy}} \approx -i\omega\mu L^2\left[\sigma_h(\xi-1)\frac{\cos^2\theta+1}{\sin^2\theta} + \sigma_h\left(1-\frac{\sigma_v}{\sigma_h}\frac{1}{\xi}\right)\right]. \tag{22}$$

With the low frequency or small spacing approximation given in Eq. (22), the apparent conductivity may be defined, for example, as follows:

$$\sigma_{UHA} \equiv +\frac{i}{K_{UHA}}\ln\frac{H_{XX}}{H_{YY}}, \tag{23}$$

where $K_{UHA}$ represents the tool constant for the harmonic anisotropy measurement:

$$K_{UHA} \equiv \omega\mu L^2. \tag{24}$$

Substituting Eq. (22) into Eq. (23) yields the following:

$$\sigma_{UHA} \approx \sigma_h(\xi-1)\frac{\cos^2\theta+1}{\sin^2\theta} + \sigma_h\left(1-\frac{\sigma_v}{\sigma_h}\frac{1}{\xi}\right), \tag{25}$$

where $\xi$ defined above in Eq. (6). It will be appreciated that as the dip angle $\theta$ approaches zero the first and second terms in Eq. (25) cancel one another. In other words:

$$\lim_{\theta\to 0}(\xi-1)\frac{1}{\sin^2\theta} = \frac{1}{2}\left(\frac{\sigma_v}{\sigma_h}-1\right). \tag{26}$$

such that $$\sigma_{UHA} = 0. \tag{27}$$

As the dip angle $\theta$ approaches 90 degrees, $\xi=\sqrt{\sigma_v/\sigma_h}$, such that:

$$\lim_{\theta\to\frac{\pi}{2}}\sigma_{UHA} \approx \sigma_h\left(\sqrt{\frac{\sigma_v}{\sigma_h}}-1\right) + \sigma_h\left(1-\sqrt{\frac{\sigma_v}{\sigma_h}}\right) = 0. \tag{28}$$

In an isotropic formation where $\sigma_h=\sigma_v$ and $\xi=1$, $$\sigma_{UHA} \approx \sigma_h(\xi-1)\frac{\cos^2\theta+1}{\sin^2\theta} + \sigma_h\left(1-\frac{\sigma_v}{\sigma_h}\frac{1}{\xi}\right) = 0. \tag{29}$$

As with the harmonic resistivity measurement described above, $\sigma_h$ and $\sigma_v$ may be complex quantities and may be expressed, for example, as follows: $\sigma_h=\sigma_{h,R}+i\sigma_{h,X}$ and $\sigma_v=\sigma_{v,R}+i\sigma_{v,X}$ where $\sigma_{h,X}=-\omega\varepsilon_h$, and $\sigma_{v,X}=-\omega\varepsilon_v$ and $\varepsilon_h$ and $\varepsilon_v$ represent horizontal and vertical dielectric constants. The phase shift and attenuation of the harmonic anisotropic measurement may be defined, for example, as follows:

$$\sigma_{UHA} \equiv \sigma_{UHAP} + i\sigma_{UHAA}. \tag{30}$$

When the frequency $f$ is low or the transmitter-receiver spacing L is small, $$\sigma_{UHAP} \approx \sigma_{h,R}(\xi_\sigma - 1)\frac{\cos^2\theta + 1}{\sin^2\theta} + \sigma_{h,R}\left(1 - \frac{\sigma_{v,R}}{\sigma_{h,R}}\frac{1}{\xi_\sigma}\right), \sigma_{h,v,R} \gg \omega\varepsilon_{h,v} \tag{31a}$$

$$\sigma_{UHAA} \approx -\omega\varepsilon_h(\zeta_\varepsilon - 1)\frac{\cos^2\theta + 1}{\sin^2\theta} - \omega\varepsilon_h\left(1 - \frac{\varepsilon_v}{\varepsilon_h}\frac{1}{\xi_\varepsilon}\right), \sigma_{h,vR} \gg \omega\varepsilon_{h,v} \tag{31b}$$

In Eqs. (31a) and (31b), $\xi_\sigma$ and $\xi_\varepsilon$ are as defined in Eqs. (16a) and (16b). In practice, the harmonic anisotropy attenuation and phase shift measurements may be expressed, for example, as follows:

$$UHAA = -20\log_{10}\left\{\frac{H_{xx}}{H_{yy}}\right\}, \tag{32a}$$

$$UHAP = \text{angle}\left\{\frac{H_{xx}}{H_{yy}}\right\}. \tag{32b}$$

The following relationships may then be found relating the conductivities and the attenuation and phase shift measurements:

$$\sigma_{UHAA} = -\frac{1}{K_{UHA}}\frac{\ln 10}{20}UHAA, \tag{33a}$$

$$\sigma_{UHAP} = -\frac{1}{K_{UHA}}\frac{\pi}{180^\circ}UHAP, \tag{33b}$$

Anti-Symmetrized Directional Measurement

The apparent conductivity of an anti-symmetrized directional measurement may be obtained, for example, as follows. Substituting the coaxial and cross couplings given in Eqs. (3) and (4) in the expression of the anti-symmetrized directional measurement yields the following expression at a low frequency $f$ or a small transmitter-receiver spacing L:

$$\ln\frac{H_{zz} + H_{zx}}{H_{zz} - H_{zx}} = \frac{ik_hL\left(1 - e^{ik_hL(\xi-1)}\right)\frac{1}{\tan\theta}}{1 - ik_hL + \frac{1}{2}ik_hL\left(1 - e^{ik_hL(\xi-1)}\right)\left(1 - \frac{1}{\tan\theta}\right)} - \frac{1}{2}\left[\frac{ik_hL\left(1 - e^{ik_hL(\xi-1)}\right)\frac{1}{\tan\theta}}{1 - ik_hL + \frac{1}{2}ik_hL\left(1 - e^{ik_hL(\xi-1)}\right)\left(1 - \frac{1}{\tan\theta}\right)}\right]^2 + \dots \tag{34}$$

Eq. (34) can be further expanded as a polynomial in terms of $k_hL$ and $k_vL$. Ignoring the higher order terms, Eq. (34) can be approximated, for example, as follows:

$$\ln\frac{H_{zz} + H_{zx}}{H_{zz} - H_{zx}} \approx -(ik_hL)^2(\xi - 1)\frac{1}{\tan\theta} = i\omega\mu L^2\sigma_h(\xi - 1)\frac{1}{\tan\theta}. \tag{35}$$

In a transversely-isotropic and homogeneous medium, $H_{zx}=H_{xz}$, such that:

$$\ln\frac{H_{zz} + H_{zx}}{H_{zz} - H_{zx}}\frac{H_{zz} + H_{xz}}{H_{zz} - H_{xz}} = 2\ln\frac{H_{zz} + H_{zx}}{H_{zz} - H_{zx}}. \tag{36}$$

Combining Eqs. (35) and (36) yields the following:

$$\ln\frac{H_{zz} + H_{zx}}{H_{zz} - H_{zx}}\frac{H_{zz} + H_{xz}}{H_{zz} - H_{xz}} \approx +2(ik_hL)^2(1 - \xi)\frac{1}{\tan\theta}. \tag{37}$$

Alternatively, $$\ln\frac{H_{zz} + H_{zx}}{H_{zz} - H_{zx}}\frac{H_{zz} + H_{xz}}{H_{zz} - H_{xz}} \approx -i2\omega\mu L^2\sigma_h(1 - \xi)\frac{1}{\tan\theta}. \tag{38}$$

With Eq. (38) in mind, the apparent conductivity for the anti-symmetrized directional measurement may be defined, for example, as follows:

$$\sigma_{UAD} \equiv +\frac{i}{K_{UAD}}\ln\frac{H_{zz} + H_{zx}}{H_{zz} - H_{zx}}\frac{H_{zz} + H_{xz}}{H_{zz} - H_{xz}}. \tag{39}$$

where $K_{UAD}$ is the tool constant for the symmetrized directional measurement and may be expressed, for example, as follows:

$$K_{UAD} \equiv 2\omega\mu L^2. \tag{40}$$

Substituting Eq. (38) into Eq. (39), yields the following:

$$\sigma_{UAD} \approx \sigma_h(1 - \xi)\frac{1}{\tan\theta}. \tag{41}$$

As the dip angle θ approaches 0, $$\lim_{\theta\to 0}(1 - \xi)\frac{1}{\tan\theta} = 0, \tag{42}$$

Therefore, $\sigma_{UAD}=0$ when the dip angle θ=0. Moreover, $\sigma_{UAD}=0$ when the dip angle θ is 90 degrees.

The apparent conductivities for the anti-symmetrized directional phase shift and attenuation may be defined, for example, as follows:

$$\sigma_{UAD} \equiv \sigma_{UADP} + i\sigma_{UADA}. \tag{43}$$

When the frequency $f$ is low or the transmitter-receiver spacing L is small, $$\sigma_{UADP} \approx \sigma_{h,R}(1 - \xi_\sigma)\frac{1}{\tan\theta}, \sigma_{h,v,R} \gg \omega\varepsilon_{h,v} \tag{44a}$$

$$\sigma_{UADA} \approx -\omega\varepsilon_h(1 - \xi_\varepsilon)\frac{1}{\tan\theta}, \sigma_{h,v,R} \ll \omega\varepsilon_{h,v} \tag{44b}$$

In the Eqs. (44a) and (44b), $\xi_\sigma$ and $\xi_\varepsilon$ are given in Eqs. (16a) and (16b). In practice, the anti-symmetrized directional attenuation and phase shift measurements may be expressed, for example, as follows:

$$UADA = -20\log_{10}\left\{\frac{H_{zz}+H_{zx}}{H_{zz}-H_{zx}}\frac{H_{zz}+H_{xz}}{H_{zz}-H_{xz}}\right\}, \tag{45a}$$

$$UADP = \text{angle}\left\{\frac{H_{zz}+H_{zx}}{H_{zz}-H_{zx}}\frac{H_{zz}+H_{xz}}{H_{zz}-H_{xz}}\right\}, \tag{45b}$$

The following relationships may then be found relating the conductivities and the attenuation and phase shift measurements:

$$\sigma_{UADA} = +\frac{1}{K_{UAD}}\frac{\ln 10}{20}UADA, \tag{46a}$$

$$\sigma_{UADP} = +\frac{1}{K_{UAD}}\frac{\pi}{180^\circ}UADP, \tag{46b}$$

Symmetrized Directional Measurement

The apparent conductivity of a symmetrized directional measurement may be obtained, for example, as follows. In a homogeneous formation, $H_{zx}=H_{xz}$, therefore:

$$\ln\frac{H_{zz}+H_{zx}}{H_{zz}-H_{zx}}\frac{H_{zz}-H_{xz}}{H_{zz}+H_{xz}} = 0. \tag{47}$$

With the low frequency or small spacing approximation given in Eq. (38), apparent conductivity of the symmetrized directional measurement may be defined, for example, as follows:

$$\sigma_{USD} \equiv -\frac{i}{K_{USD}}\ln\frac{H_{zz}+H_{zx}}{H_{zz}-H_{zx}}\frac{H_{zz}-H_{xz}}{H_{zz}+H_{xz}}, \tag{48}$$

where $K_{USD}$ represents the tool constant for the symmetrized directional measurement and is given as follows:

$$K_{USD} \equiv K_{UAD} = 2\omega\mu L^2. \tag{49}$$

In practice, the symmetrized directional attenuation and phase shift measurements may be expressed, for example, as follows:

$$USDA = -20\ \log_{10}\left\{\frac{H_{zz}+H_{zx}}{H_{zz}-H_{zx}}\frac{H_{zz}-H_{xz}}{H_{zz}+H_{xz}}\right\}, \tag{50a}$$

$$USDP = \text{angle}\left\{\frac{H_{zz}+H_{zx}}{H_{zz}-H_{zx}}\frac{H_{zz}-H_{xz}}{H_{zz}+H_{xz}}\right\}, \tag{50b}$$

Likewise, the apparent conductivities for the symmetrized directional phase shift and attenuation may be defined as follows:

$$\sigma_{USD} \equiv \sigma_{USDP} + i\sigma_{USDA}. \tag{51}$$

The following relationships may then be found relating the conductivities and the attenuation and phase shift measurements:

$$\sigma_{USDA} = +\frac{1}{K_{USD}}\frac{\ln 10}{20}USDA, \tag{52a}$$

$$\sigma_{USDP} = +\frac{1}{K_{USD}}\frac{\pi}{180^\circ}USDP, \tag{50b}$$

It should be noted that in theory the air signal is zero for the phase shift of harmonic resistivity measurement and the attenuation and phase shift of the harmonic anisotropy measurement, the anti-symmetrized directional measurement, and the symmetrized directional measurement. However, the air signal for these measurements may not be zero for a real tool. It will be appreciated that air signals of a real tool may be measured (e.g., via an air hang test) and subtracted from the phase shift and attenuation data before being converted to apparent conductivities using the above mathematical relations.

It will be appreciated that although the measurements are described above and throughout this disclosure in the form of magnetic fields, that the same method may be used directly for measurements expressed in the form of voltages, impedances, and other forms. Moreover, it will be appreciated that although the tool constant is determined based on a logarithmic ratio of measurements, that the same method can be used to determine tool constants for a ratio of measurements without the logarithmic operation.

Skin-Effect Correction

It has been found that for deep electromagnetic measurements in which the dielectric signal is negligibly small (e.g., when the dielectric constant of the formation is small), the first term of the polynomial expansion of the attenuation apparent conductivity is the same as the second term of the expansion of the phase shift apparent conductivity but with opposite in sign. This finding may enable a first-order skin-effect correction for each the above disclosed phase shift apparent conductivities to be obtained by computing a sum of the phase shift apparent conductivity and the attenuation apparent conductivity, for example, as follows:

$$\sigma_{UHRP}^C \approx \sigma_{UHRP} + \sigma_{UHRA}, \tag{53a}$$

$$\sigma_{UHAP}^C \approx \sigma_{UHAP} + \sigma_{UHAA}, \tag{53b}$$

$$\sigma_{UADP}^C \approx \sigma_{UADP} + \sigma_{UADA}, \tag{53c}$$

$$\sigma_{USDP}^C \approx \sigma_{USDP} + \sigma_{USDA}, \tag{53d}$$

where $$\sigma_{UHRP}^C,\ \sigma_{UHAP}^C,\ \sigma_{UADP}^C \text{ and } \sigma_{USDP}^C$$

represent the skin-effect corrected harmonic resistivity, harmonic anisotropy, anti-symmetrized directional and symmetrized directional measurements.

Apparent Dielectric Constant

In measurements in which the displacement current is dominant over the conduction current in the formation such as when the dielectric constant is large and $\sigma_{h,v,R} \ll \omega\varepsilon_{h,v}$ the apparent dielectric constant may be computed from the attenuation apparent conductivities, for example, as follows:

$$\varepsilon_{r,UHRA} = -\frac{1}{\omega\varepsilon_0}\sigma_{UHRA}, \tag{54a}$$

-continued $$\varepsilon_{r,UHAA} = -\frac{1}{\omega\varepsilon_0}\sigma_{UHAA}, \quad (54b)$$

$$\varepsilon_{r,UADA} = -\frac{1}{\omega\varepsilon_0}\sigma_{UADA}, \quad (54c)$$

$$\varepsilon_{r,USDA} = -\frac{1}{\omega\varepsilon_0}\sigma_{USDA}, \quad (54d)$$

where $\varepsilon_{r,UHRA}$, $\varepsilon_{r,UHAA}$, $\varepsilon_{r,UADA}$, and $\varepsilon_{r,USDA}$ represent the dielectric constant values computed from the harmonic resistivity, harmonic anisotropy, anti-symmetrized directional and symmetrized directional measurements.

Conductivity Measurement Errors

Knowledge of the deep electromagnetic measurement errors in both the phase shift and attenuation quantities advantageously enables corresponding errors in conductivity to be found directly using Eqs. (19a), (19b), (33a), (33b), (46a), (46b), (52a) and (52b), for example, as follows:

$$\Delta\sigma_{UHRA} = \frac{1}{K_{UHR}}\frac{\ln 10}{20}\Delta UHRA \quad (55a)$$

$$\Delta\sigma_{UHRP} = \frac{1}{K_{UHR}}\frac{\pi}{180^\circ}\Delta UHRP \quad (55b)$$

$$\Delta\sigma_{UHAA} = \frac{1}{K_{UHA}}\frac{\ln 10}{20}\Delta UHAA \quad (55c)$$

$$\Delta\sigma_{UHAP} = \frac{1}{K_{UHA}}\frac{\pi}{180^\circ}\Delta UHAP \quad (55d)$$

$$\Delta\sigma_{UADA} = \frac{1}{K_{UAD}}\frac{\ln 10}{20}\Delta UADA \quad (55e)$$

$$\Delta\sigma_{UADP} = \frac{1}{K_{UAD}}\frac{\pi}{180^\circ}\Delta UADP \quad (55f)$$

$$\Delta\sigma_{USDA} = \frac{1}{K_{USD}}\frac{\ln 10}{20}\Delta USDA \quad (55g)$$

$$\Delta\sigma_{USDP} = \frac{1}{K_{USD}}\frac{\pi}{180^\circ}\Delta USDP \quad (55h)$$

where ΔUHRA and ΔUHRP represent measurement errors in the harmonic resistivity attenuation and phase shift data, ΔUHAA and ΔUHAP represent measurement errors in the harmonic anisotropy attenuation and phase shift data, ΔUADA and ΔUADP represent measurement errors in the anti-symmetrized directional attenuation and phase shift data, and ΔUSDA and ΔUSDP represent measurement errors in the symmetrized directional attenuation and phase shift data. $\Delta\sigma_{UHRA}$ and $\Delta\sigma_{UHRP}$ represent the corresponding errors in the harmonic resistivity attenuation and phase shift apparent conductivities, $\Delta\sigma_{UHAA}$ and $\Delta\sigma_{UHAP}$ represent the corresponding errors in the harmonic anisotropy attenuation and phase shift apparent conductivities, $\Delta\sigma_{UADA}$ and $\Delta\sigma_{UADP}$ represent the corresponding errors in the anti-symmetrized directional attenuation and phase shift apparent conductivities, and $\Delta\sigma_{USDA}$ and $\Delta\sigma_{USDP}$ Represent the Corresponding Errors in the Symmetrized Directional Attenuation and phase shift apparent conductivities.

It will be appreciated that Eqs. (55a)-(55h) enable errors (e.g., error bands) in the phase shift apparent conductivity and the attenuation apparent conductivity to be computed directly from corresponding errors (or error bands) for the phase shift and attenuation propagation measurements. Such direct computations of the conductivity errors may advantageously obviate the need for forward modeling techniques that are commonly utilized to determine conductivity errors when making commercial propagation measurements. Moreover, in example embodiments, the errors may be advantageously computed using a low power processor such as is located downhole in the propagation tool.

Example Numerical Results

The non-limiting examples that follow are intended to further illustrate the disclosed embodiments. These examples are not intended to limit the disclosure and should not be construed as in any way limiting the scope thereof. In each of the following examples, a conceptual tool is considered that includes a triaxial transmitter spaced apart from a triaxial receiver. Transmitter receiver spacing distances of 10, 20, and 30 meters are considered at operating frequencies of 1, 2, 5, 10, 20, 40, 80 KHz. A hypothetical 0 Hz frequency (plotted with a dashed line) is also considered to evaluate the low frequency limit.

Figure 5:
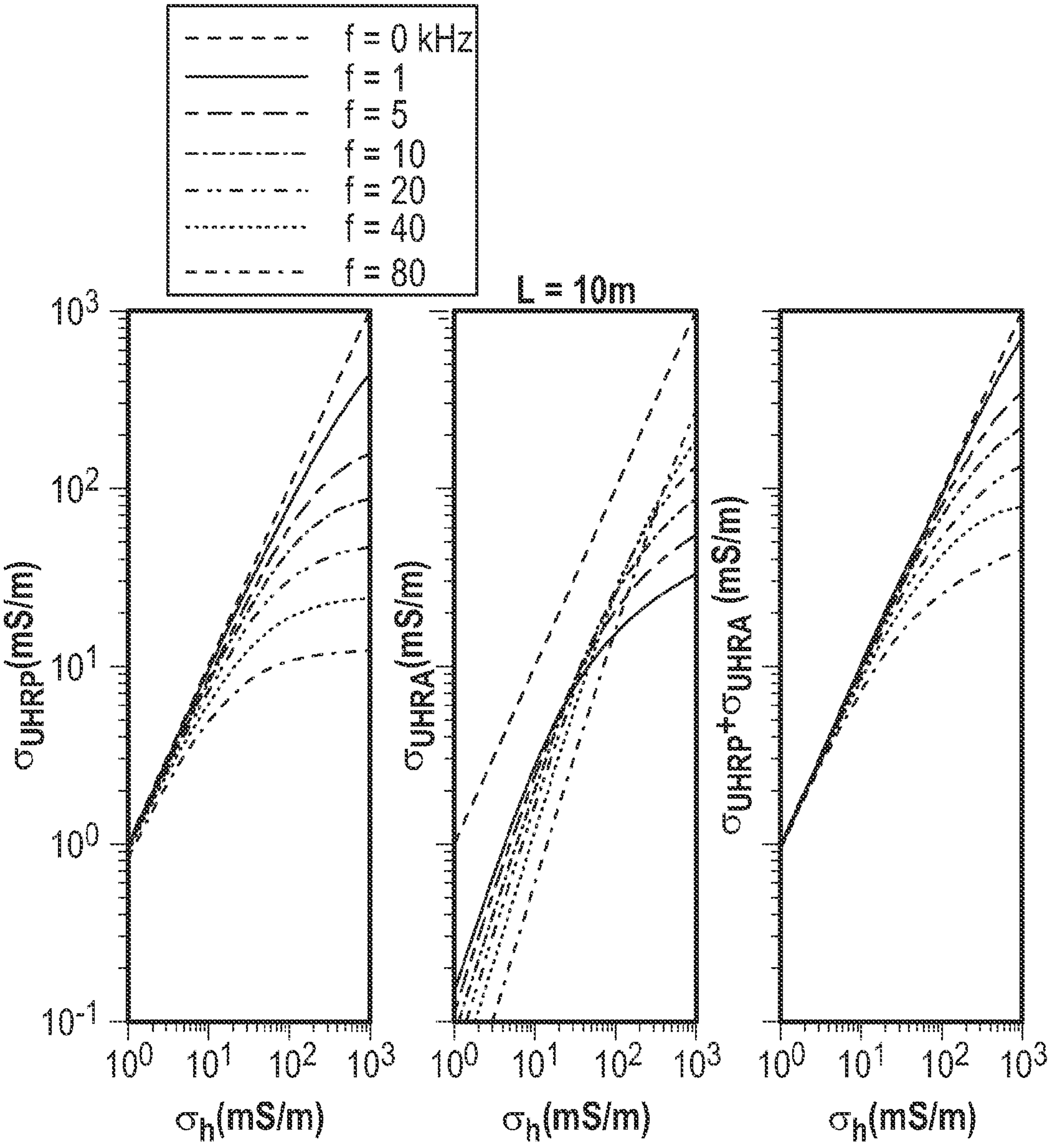
FIGS. 5, 6, and 7 depict plots of apparent conductivities $\sigma_{UHRP}$ and $\sigma_{UHRA}$ of the harmonic resistivity measurement versus conductivity for an isotropic, homogenous formation at spacing distances of 10 meters (FIG. 5), 20 meters (FIG. 6), and 30 meters (FIG. 7).
Figure 6:
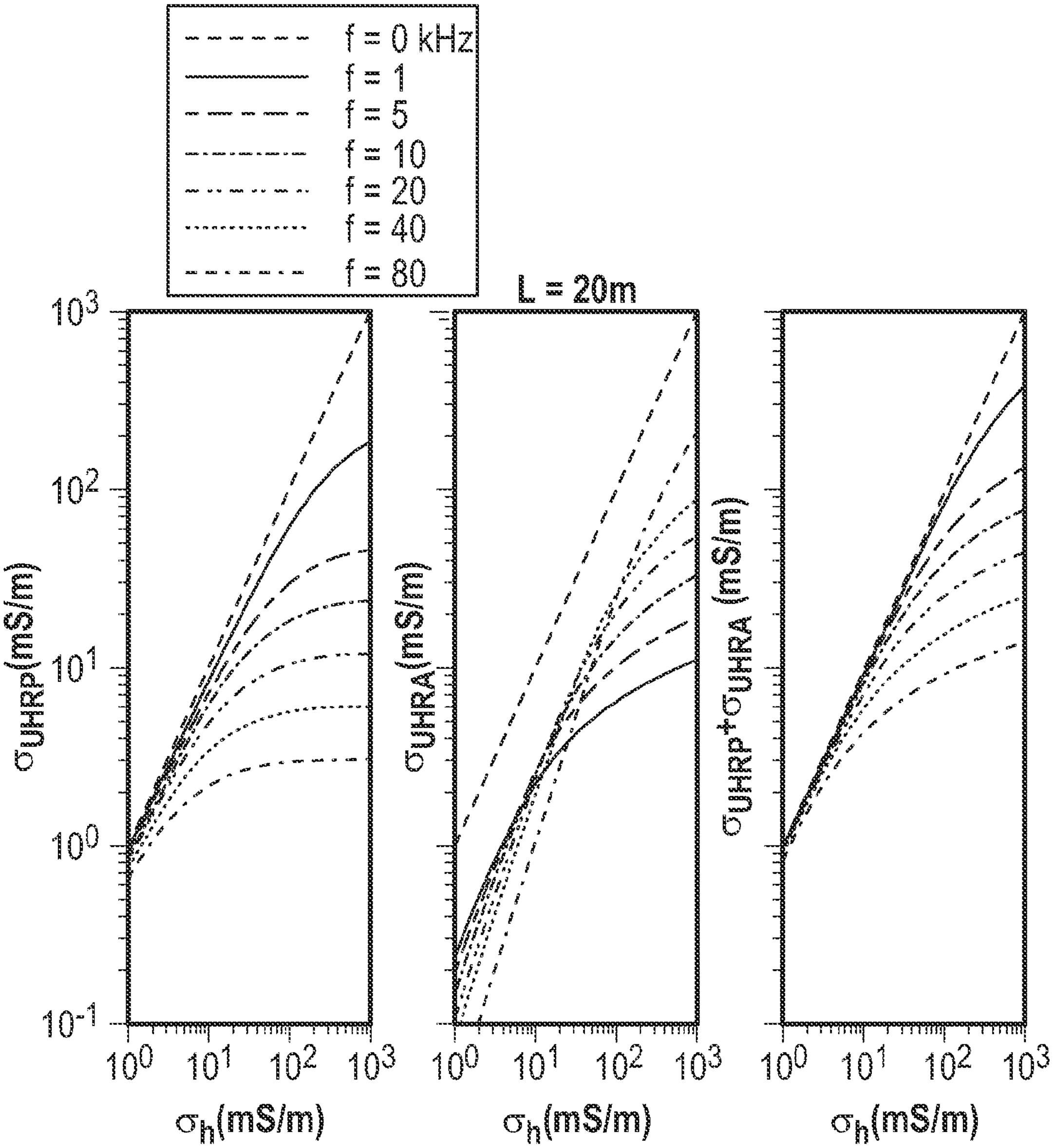
Figure 7:
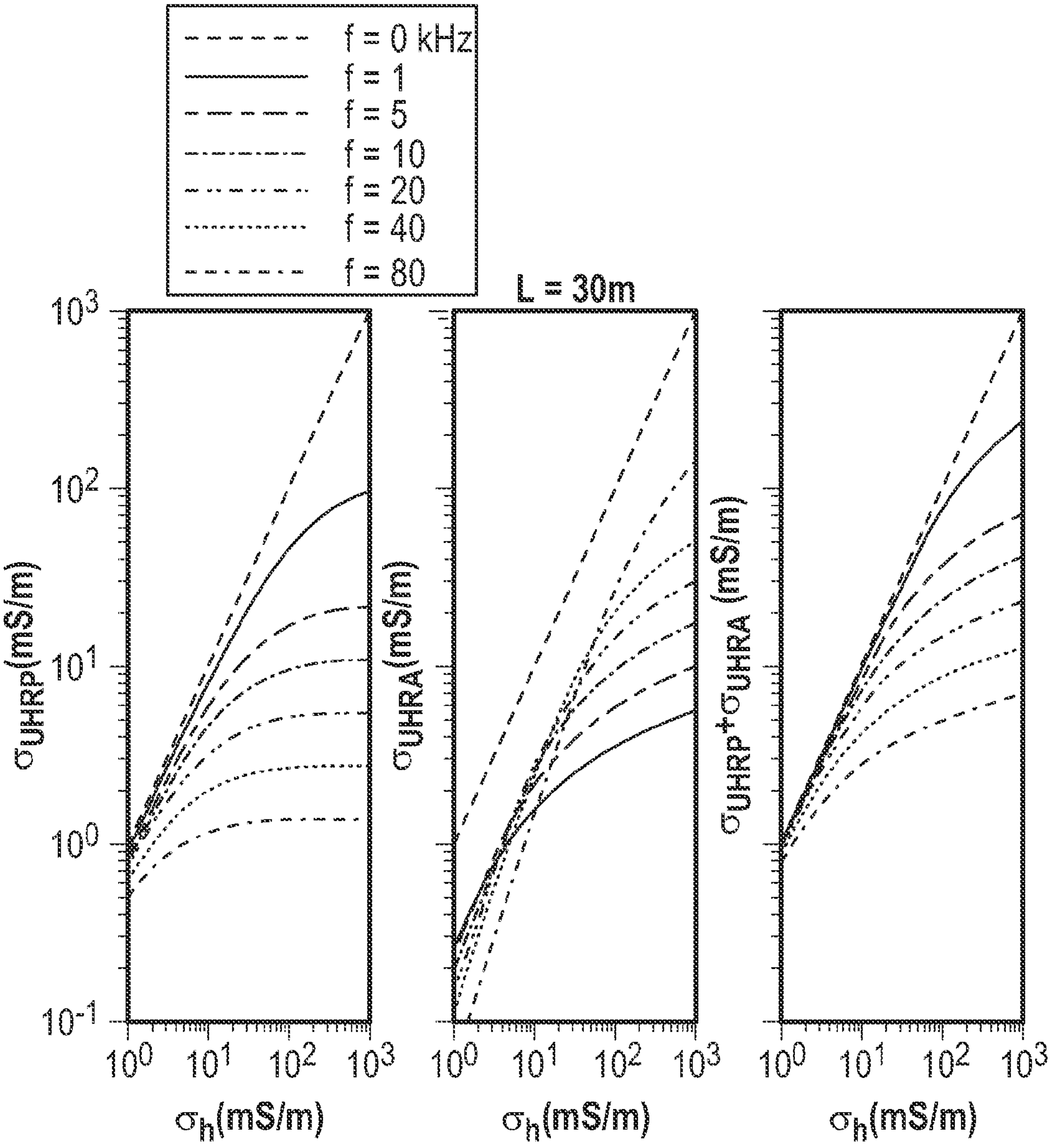

FIGS. 5, 6, and 7 depict plots of apparent conductivities $\sigma_{UHRP}$ and $\sigma_{UHRA}$ of the harmonic resistivity measurement versus conductivity for an isotropic, homogenous formation. The first track on the left of each figure plots the phase shift apparent conductivity $\sigma_{UHRP}$, the second track at the center of each figure plots the attenuation apparent conductivity $\sigma_{UHRA}$, and the third track on the right plots the skin-effect corrected phase shift apparent conductivity $$\sigma^C_{UHRP}.$$

In the example, $$\sigma^C_{UHRP}$$

is the sum of $\sigma_{UHRP}$ and $\sigma_{UHRA}$ as depicted. The transmitter receiver spacing distances were 10 (FIG. 5), 20 (FIG. 6), and 30 (FIG. 7) meters. Each plot further includes at least one arrow indicating the direction of increasing frequency (from 0 to 80 kHz).

As depicted on the left-hand track of FIGS. 5, 6, and 7, $\sigma_{UHRP}$ approaches the Doll's limit (the dashed line representing a frequency of 0 Hz) at lower formation conductivities and at low frequencies (as expected based on Eq. (15a)). These plots further show that $\sigma_{UHRP}$ saturates at high formation conductivities (i.e., $\sigma_{UHRP}$ becomes insensitive to increasing formation conductivity at high conductivities). Moreover, the onset of the saturation moves to lower formation conductivities as the measurement frequency increases and as the spacing L increases (comparing FIG. 5 with FIG. 7).

As depicted on the center track of FIGS. 5, 6, and 7, the attenuation apparent conductivity $\sigma_{UHRA}$ can be significantly different from the true formation conductivity when the formation conductivity is low. As shown in Eq. (15b), $\sigma_{UHRA}$ can be strongly affected by dielectric properties of the formation, particularly at low frequencies when the dielectric signal is dominant. In this case, the dielectric signal is 0 ($\varepsilon_{h,v}$=0). In the absence of a dielectric signal, $\sigma_{UHRA}$ largely measures the skin-effect when the formation conductivity is low. The $\sigma_{UHRA}$ measurement further differs from the $\sigma_{UHRP}$ measurement in that it increases monotonically with increasing conductivity (rather than saturating).

As depicted on the right-hand track of FIGS. 5, 6, and 7, the skin-effect corrected measurement $\sigma_{UHRP}+\sigma_{UHRA}$ tends to combine the best features of each of the $\sigma_{UHRP}$ and $\sigma_{UHRA}$ measurements. Note that the combined (skin-effect corrected) measurement approaches the Doll's limit at lower formation conductivities and at low frequencies (similar to the $\sigma_{UHRP}$ measurement). Moreover, the combined measurement doesn't saturate with increasing formation conductivity, but rather increases monotonically (similar to the $\sigma_{UHRA}$ measurement).

Figure 8:
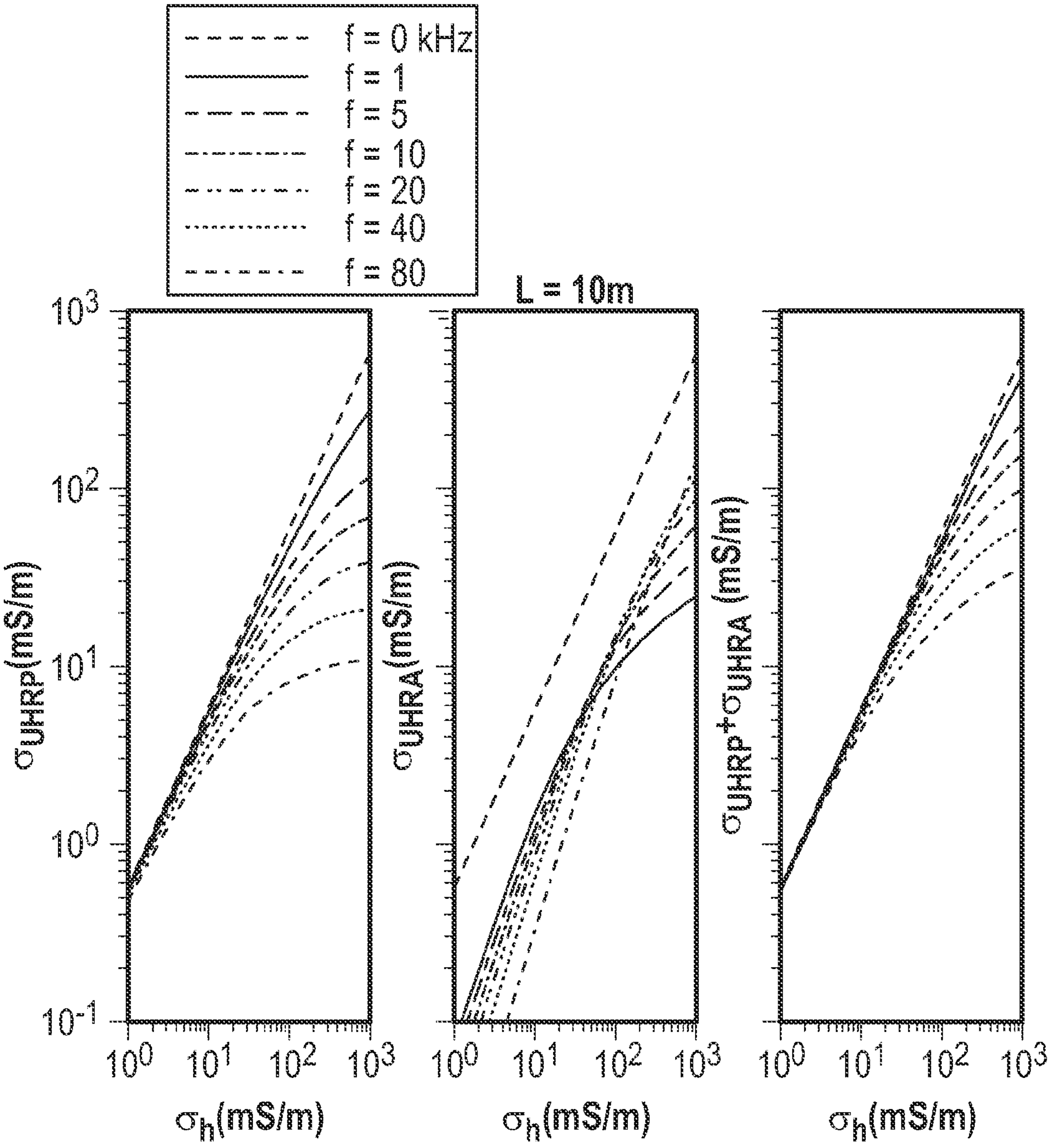
FIGS. 8, 9, and 10 depict plots of apparent conductivities of the harmonic resistivity (FIG. 8), harmonic anisotropy (FIG. 9), and anti-symmetrized directional (FIG. 10) measurements versus formation conductivity in a dipping, transversely-isotropic and homogenous formation.
Figure 9:
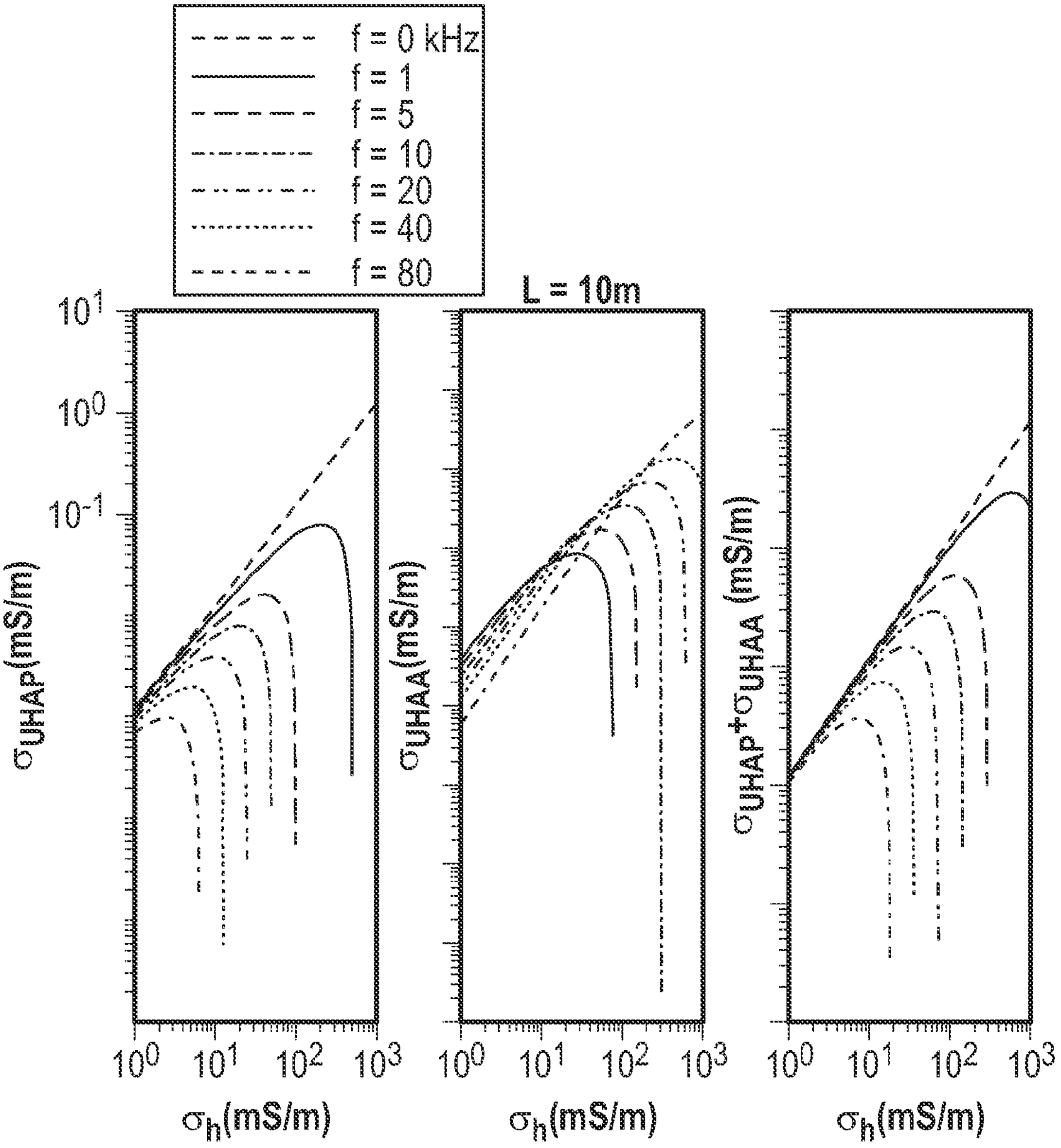
Figure 10:
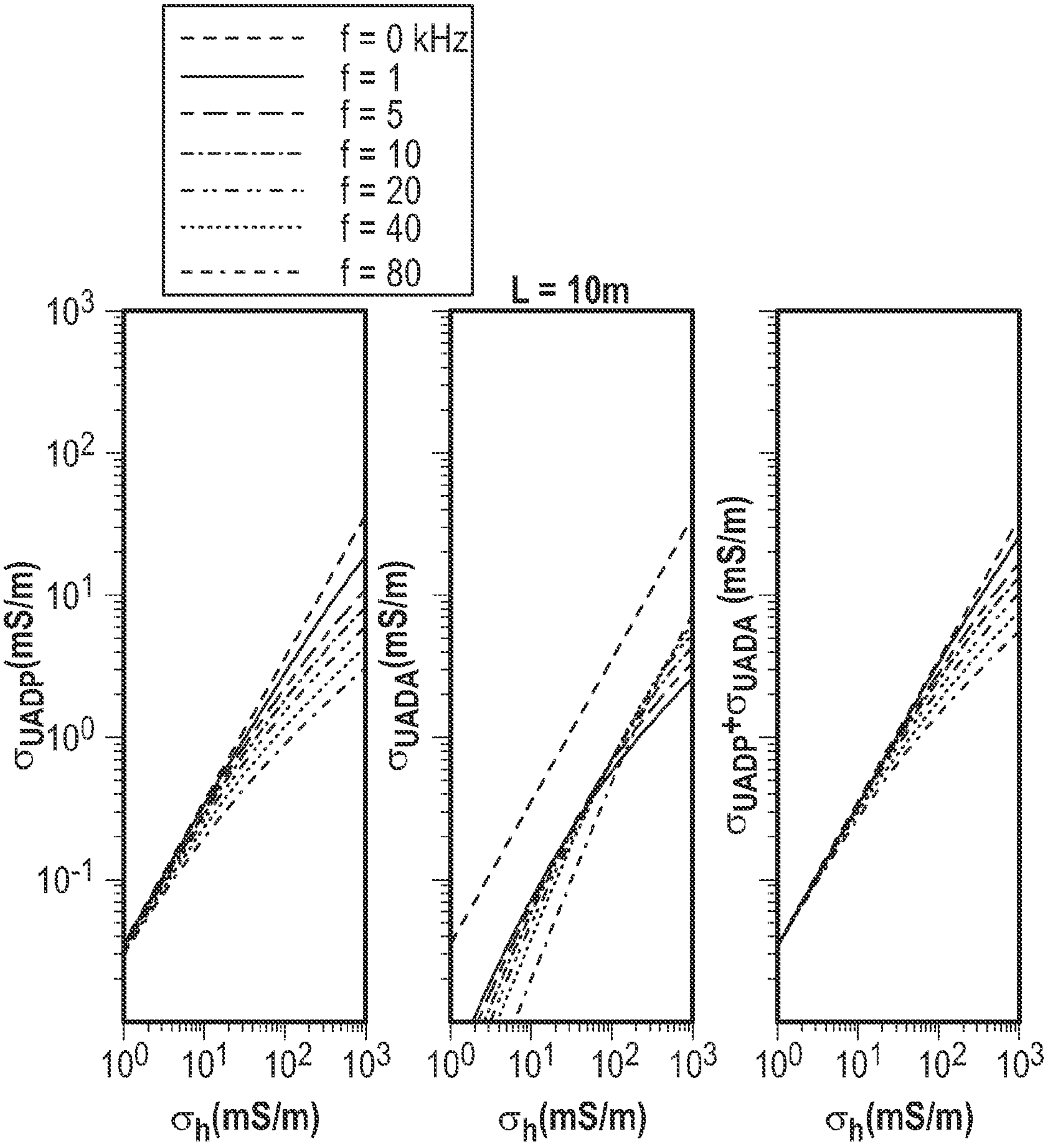

FIGS. 8, 9, and 10 depict plots of apparent conductivities of the harmonic resistivity (FIG. 8), harmonic anisotropy (FIG. 9), and anti-symmetrized directional (FIG. 10) measurements versus formation conductivity in a dipping, transversely-isotropic and homogenous formation. The dip angle $\theta$ in this example was 5 degrees, the anisotropy ratio $\sigma_v/\sigma_h$ was 5, and the transmitter receiver spacing L was 10 m. Each plot further includes at least one arrow indicating the direction of increasing frequency (from 0 to 80 kHz).

FIG. 8 shows that the response of the $\sigma_{UHRP}$ and $\sigma_{UHRA}$ of harmonic resistivity measurements is similar to those described above with respect to FIGS. 5, 6, and 7 for the isotropic formation. Again, the combination of $\sigma_{UHRP}$ and $\sigma_{UHRA}$ (to obtain a skin-effect corrected measurement) appears to provide an improved measurement as compared to either measurement alone (particularly at the higher formation conductivities).

As depicted on FIG. 9, the response of the $\sigma_{UHAP}$ and $\sigma_{UHAA}$ of harmonic anisotropy measurements is similar to the $\sigma_{UHRP}$ and $\sigma_{UHRA}$ harmonic resistivity measurement at low formation conductivities and frequencies. In particular, $\sigma_{UHAP}$ measurement approaches the Doll's limit at low formation conductivities and frequencies as given in Eq. (31a). In contrast, the $\sigma_{UHAA}$ measurement is considerably smaller than the true formation conductivity, due to largely measuring the skin-effect at the low conductivity. At higher formation conductivities, $\sigma_{UHAP}$ and $\sigma_{UHAA}$ measurements become highly non-linear and roll over at higher formation conductivity values (i.e., rapidly approach zero at a frequency dependent formation conductivity value). Although still highly non-linear, the combined measurement $\sigma_{UHAP}+\sigma_{UHAA}$ is better than either of the original measurements in that it has a better response at low conductivity and a broader range of monotonicity.

FIG. 10 depicts the response of the $\sigma_{UADP}$ and $\sigma_{UADA}$ of anti-symmetrized directional measurements. Overall, $\sigma_{UADP}$ and $\sigma_{UADA}$ measurements appear similar to the $\sigma_{UHRP}$ and $\sigma_{UHRA}$ measurements as their responses are monotonic with regard to the formation conductivity. In particular, the $\sigma_{UADP}$ measurement approaches the Doll's limit at low formation conductivities and frequencies but does not saturate as described above for the $\sigma_{UHRP}$ measurement. Again, the combination (sum) of $\sigma_{UADP}$ and $\sigma_{UADA}$ (to obtain a skin-effect corrected measurement) appears to provide an improved measurement as compared to either measurement alone (particularly at high formation conductivity values).

Figure 11:
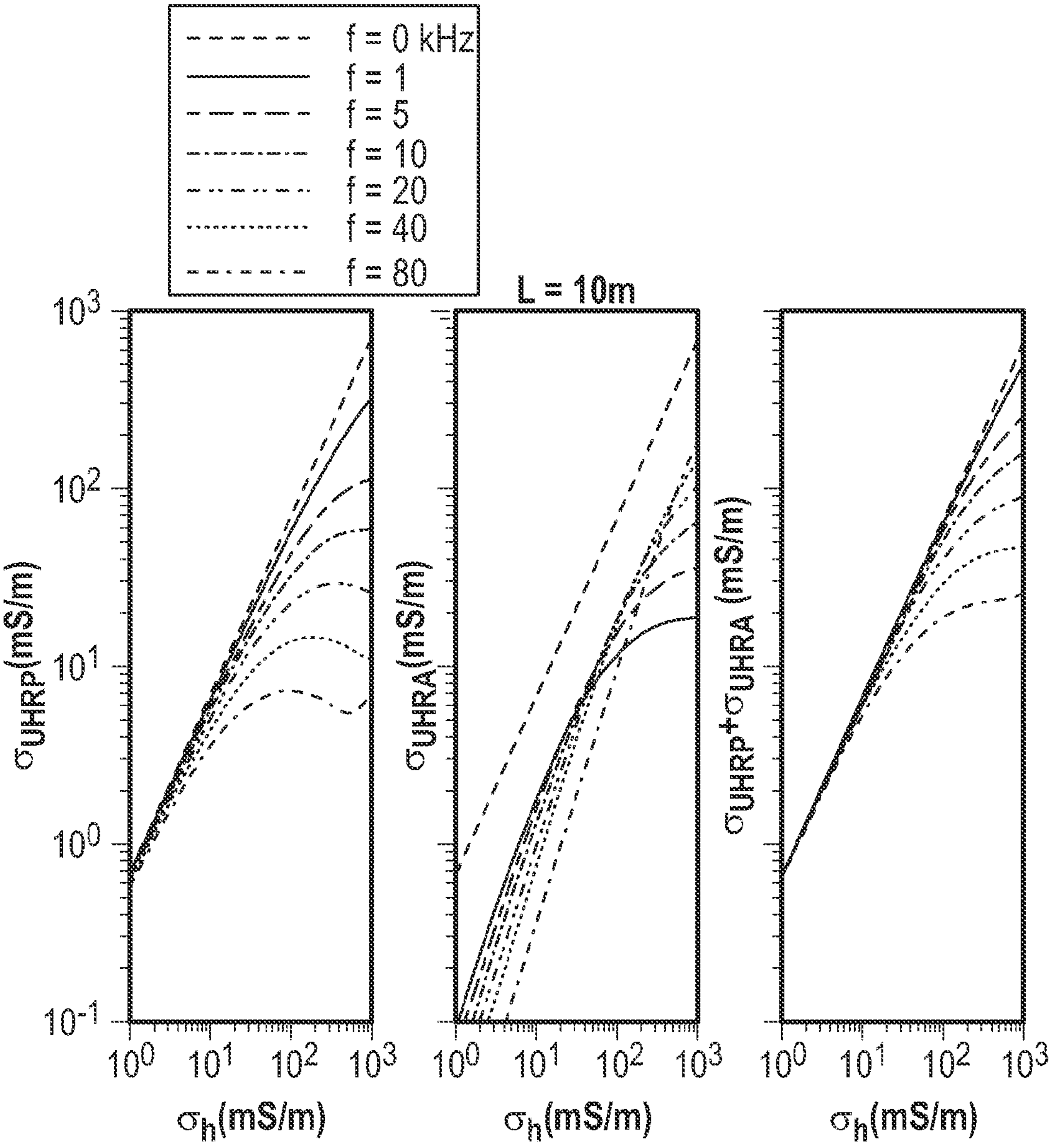
FIGS. 11, 12, and 13 depict plots of apparent conductivities of the harmonic resistivity (FIG. 11), harmonic anisotropy (FIG. 12), and anti-symmetrized (FIG. 13) measurements in a transversely-isotropic and homogenous formation at a high dip angle of 65 degrees.
Figure 12:
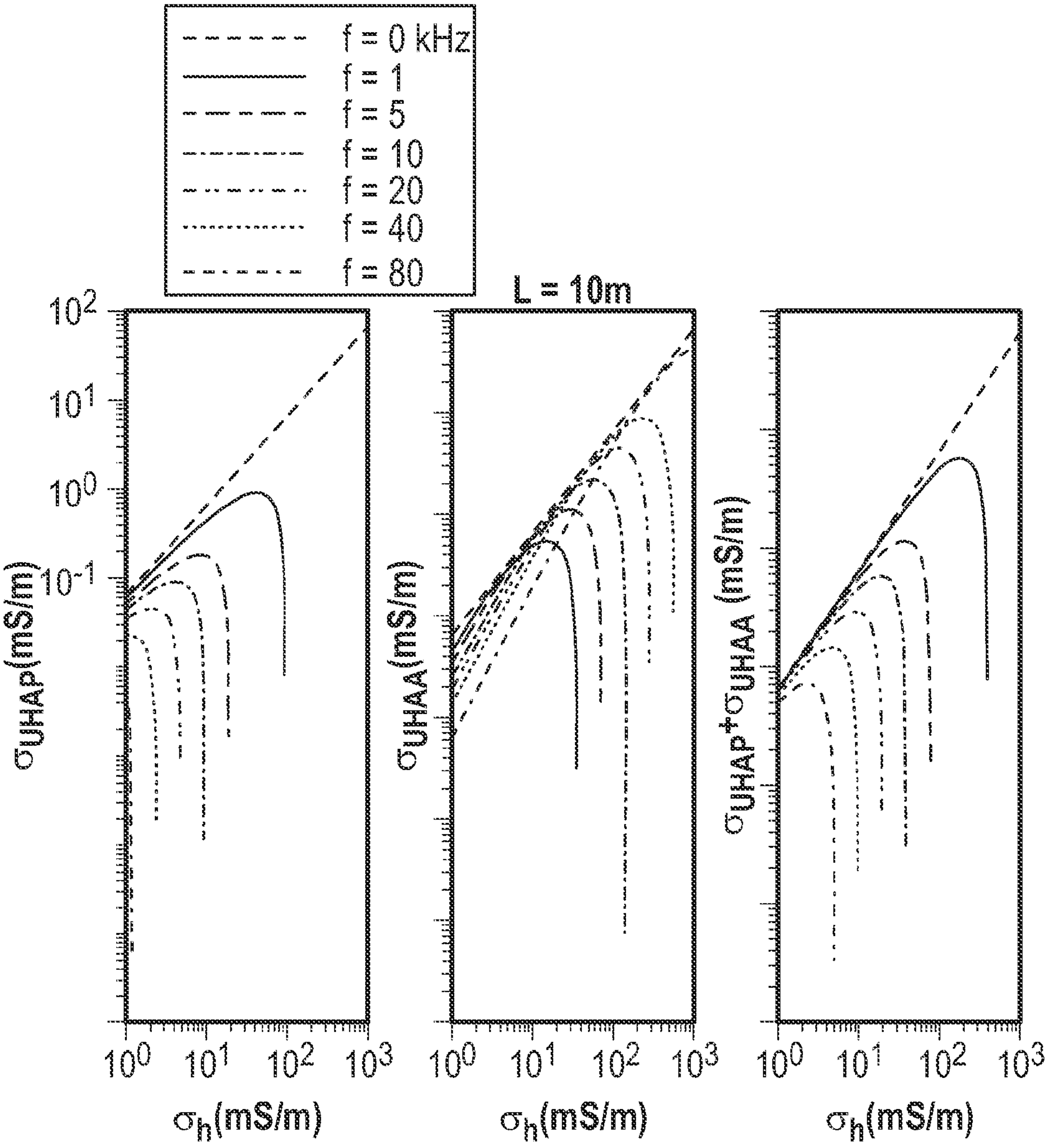
Figure 13:
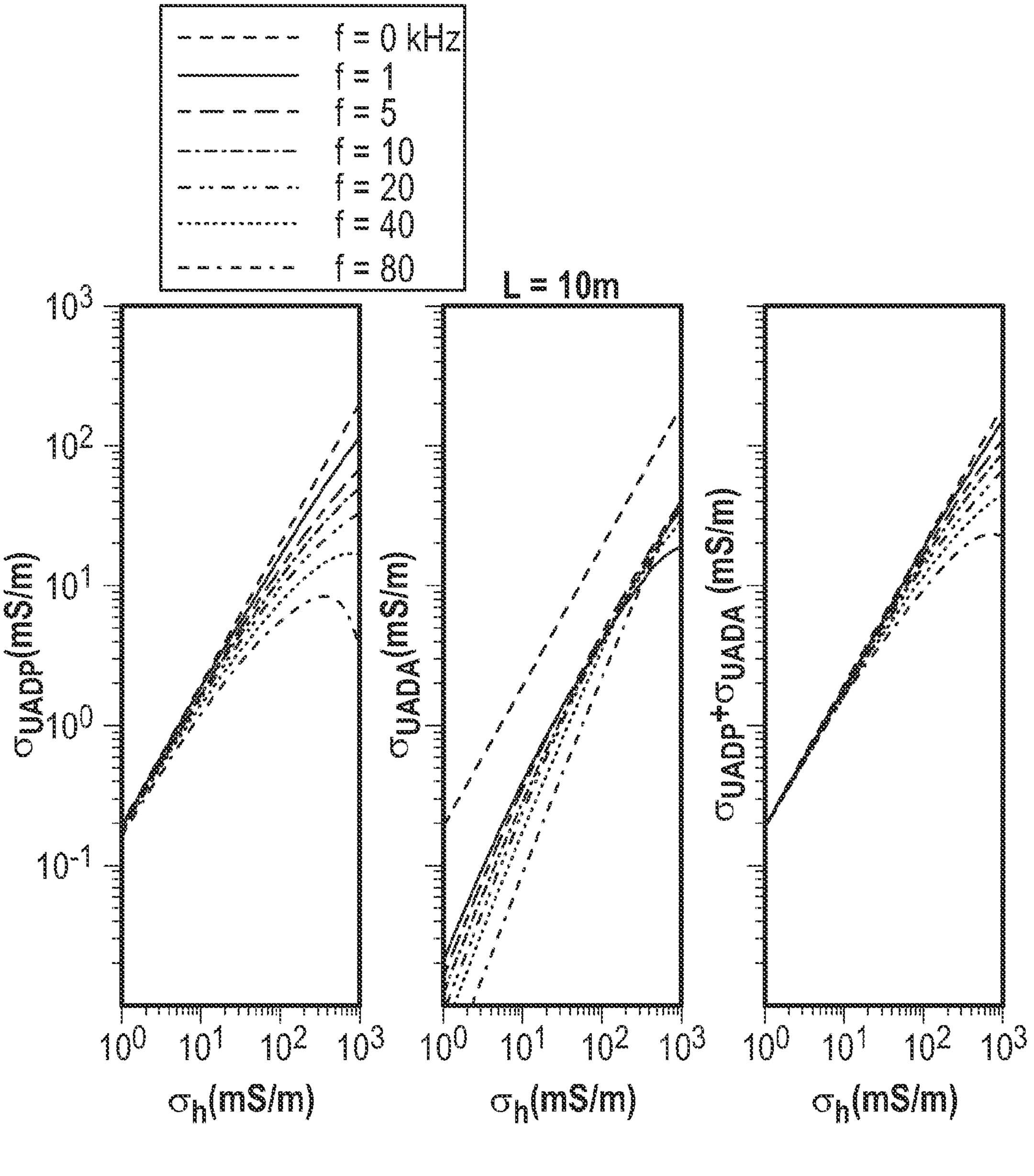

FIGS. 11, 12, and 13 depict plots of apparent conductivities of the harmonic resistivity (FIG. 11), harmonic anisotropy (FIG. 12), and anti-symmetrized (FIG. 13) measurements in a transversely-isotropic and homogenous formation at a high dip angle of 65 degrees. The anisotropy ratio $\sigma_v/\sigma_h$ of the formation was 5 and the transmitter-receiver spacing L was 10 meters. Overall, the high dip angle appears to increase the nonlinearity of the measurements. Despite the increased non-linearity, the features identified in the preceding isotropic and low dip anisotropic cases remain intact.

In particular, the phase shift apparent conductivities, namely $\sigma_{UHRP}$, $\sigma_{UHAP}$ and $\sigma_{UADP}$, approach the Doll's limit at low conductivities and low frequencies as described above. Moreover, the measurements either saturate or become highly non-linear at higher frequencies and higher formation conductivities.

The attenuation apparent conductivities, namely $\sigma_{UHRA}$, $\sigma_{UHAA}$ and $\sigma_{UADA}$, largely measure the skin-effect signal at the low conductivity as described above. As a result, $\sigma_{UHRA}$, $\sigma_{UHAA}$ and $\sigma_{UADA}$ trend towards zero more rapidly than the corresponding apparent phase shift conductivities $\sigma_{UHRP}$, $\sigma_{UHAP}$ and $\sigma_{UADP}$ at lower formation conductivity values.

Moreover, the skin-effect corrected measurements (the combined measurements) plotted on the right-hand side of each of FIGS. 11, 12, and 13 appear to be superior to the individual measurements. It will be understood that the attenuation apparent conductivities appear to serve as a first-order skin-effect correction to their phase shift counterpart. The combined apparent conductivities were therefore more representative of the true formation signal and had a broader range of monotonicity.

Figure 14:
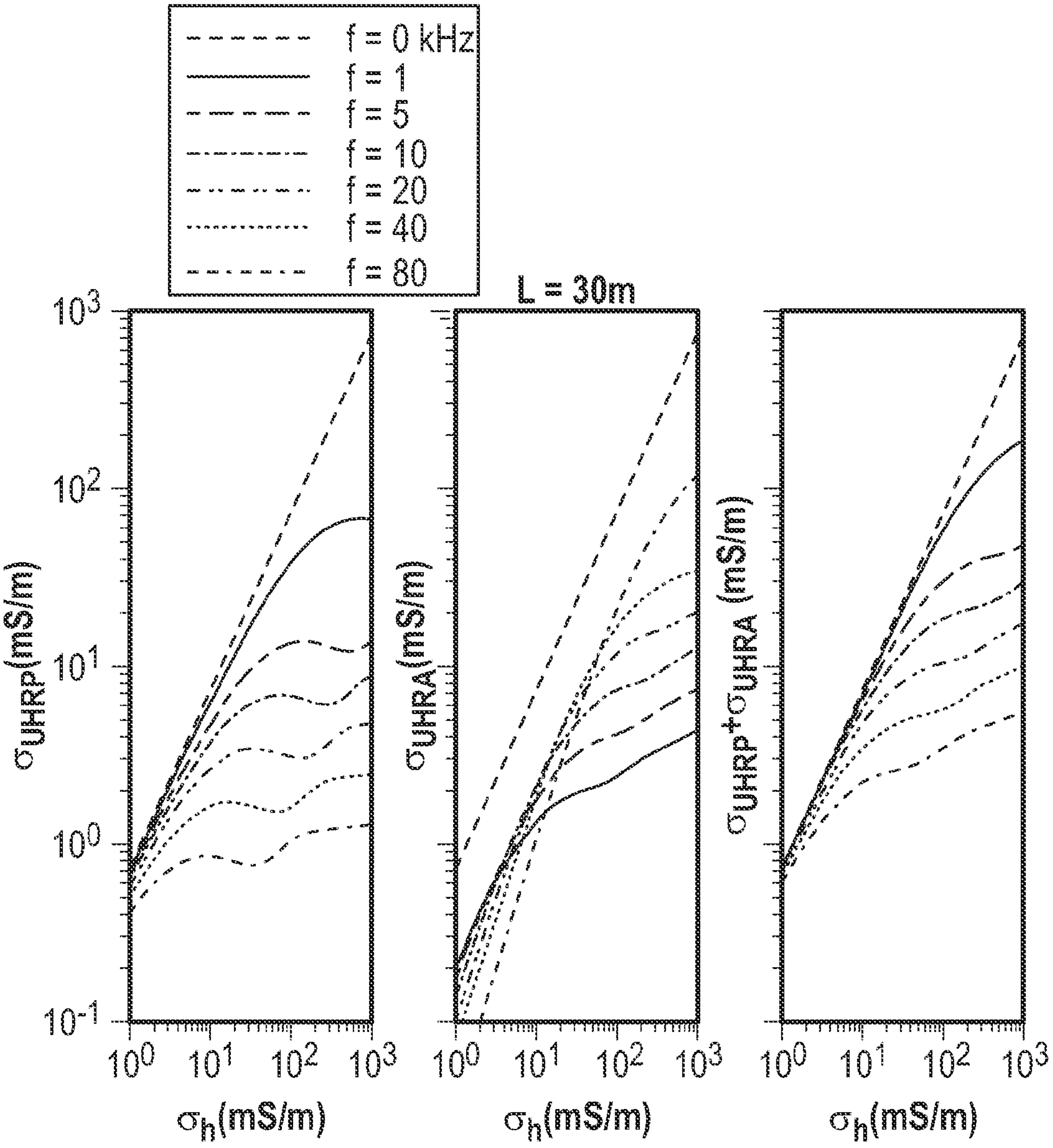
FIGS. 14 and 15 depict plots of apparent conductivities of the harmonic resistivity (FIG. 14) and anti-symmetrized directional (FIG. 15) measurements in a transversely-isotropic and homogenous formation having a very a high dip of 85 degrees.
Figure 15:
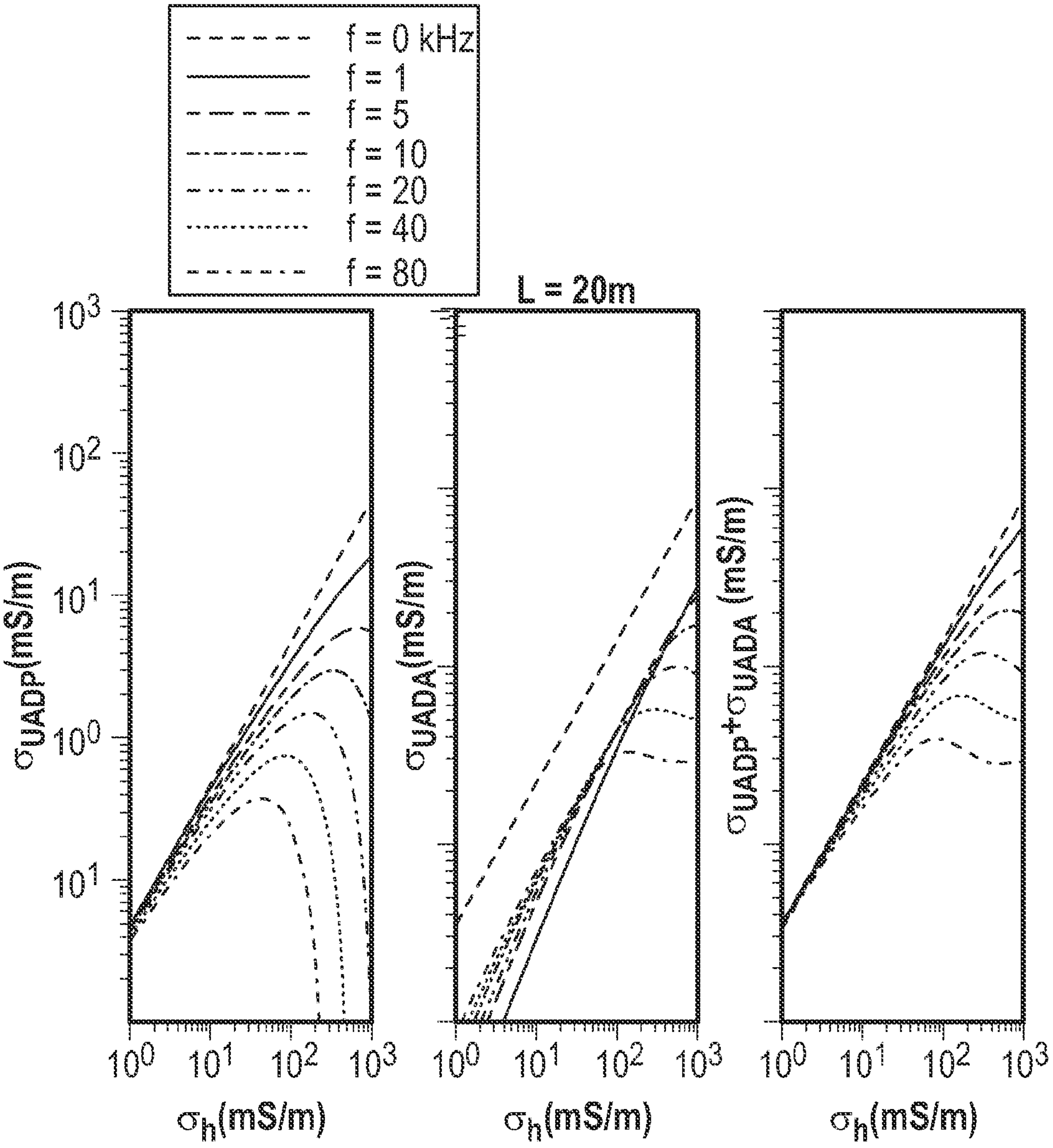

FIGS. 14 and 15 depict plots of apparent conductivities of the harmonic resistivity (FIG. 14) and anti-symmetrized directional (FIG. 15) measurements in a transversely-isotropic and homogenous formation having a very a high dip of 85 degrees. The anisotropy ratio $\sigma_v/\sigma_h$ of the formation was 5. The transmitter receiver spacing distances were 20 (FIG. 15) and 30 (FIG. 14) meters.

FIG. 14 shows that the response of the $\sigma_{UHRP}$ and $\sigma_{UHRA}$ of harmonic resistivity measurements is similar the response described above (e.g., $\sigma_{UHRP}$ approaching the Doll's limit at low conductivities and frequencies). The $\sigma_{UHRP}$ measurements appear more non-linear at the very high dip angles because $\sigma_{UHRP}$ can be multi-valued at higher conductivities (due in part to the increased transmitter-receiver spacing and in part due to the high dip angle). As also described previously the combined measurement (in the right-hand track) provides a more representative measurement of the true formation conductivity and had a broader range of monotonicity.

FIG. 15 shows that the response of the $\sigma_{UADP}$ and $\sigma_{UADA}$ of anti-symmetrized directional measurements are similar to that described above with respect to FIG. 13 (at a dip angle of 65 degrees). For example, the $\sigma_{UADP}$ measurement approaches the Doll's limit at low conductivities and frequencies. When the conductivity is high, both $\sigma_{UADP}$ and $\sigma_{UADA}$ can roll over, resulting in an undesirable double-valued response. Again, the combined measurement is generally superior to either measurement individually.

It will be appreciated that the disclosed embodiments may further include a system for estimating apparent conductivity from the measured EM propagation measurements. Such a system may include computer hardware and software configured to execute the above described embodiments. The system may further include an EM propagation tool configured to make electromagnetic propagation measurements in a wellbore. The hardware may include one or more processors (e.g., microprocessors) which may be connected to one or more data storage devices (e.g., hard drives or solid state memory) and user interfaces. The processor(s) may be deployed in the propagation tool or located at the surface (e.g., in a personal computer or network device) and may be configured to compute one or more of the apparent conductivity values disclosed above. It will be further understood that the disclosed embodiments may include processor executable instructions stored in the data storage device. The disclosed embodiments are, of course, not limited to the use of or the configuration of any particular computer hardware and/or software.

It will be understood that the present disclosure includes numerous embodiments. These embodiments include, but are not limited to, the following embodiments.

In a first embodiment, a method for estimating an apparent conductivity of a subterranean formation comprises acquiring at least first and second electromagnetic propagation measurements, the first and second electromagnetic propagation measurements made in a wellbore penetrating the subterranean formation using an electromagnetic propagation tool including at least one transmitting antenna spaced apart by a spacing distance from at least one receiving antenna; computing a ratio using the at least first and second electromagnetic propagation measurements; and estimating the apparent conductivity from the ratio.

A second embodiment may include the first embodiment, wherein the apparent conductivity is complex-valued; and the estimating comprises estimating a phase shift apparent conductivity from an imaginary portion of the ratio and estimating an attenuation apparent conductivity from a real portion of the ratio.

A third embodiment may include the second embodiment, further comprising computing a skin-effect measurement from a sum of the real portion of the ratio and the imaginary portion of the ratio.

A fourth embodiment may include any one of the second through third embodiments, further comprising computing a skin-effect corrected apparent conductivity from a sum of the phase shift apparent conductivity and the attenuation apparent conductivity.

A fifth embodiment may include any one of the second through fourth embodiments, further comprising computing an apparent dielectric constant of the subterranean formation from the attenuation apparent conductivity.

A sixth embodiment may include any one of the first through fifth embodiments, further comprising computing a corresponding attenuation apparent conductivity error or a phase shift apparent conductivity error from at least one of an attenuation measurement error and a phase shift measurement error.

A seventh embodiment may include any one of the first through sixth embodiments, further comprising acquiring an air signal for the electromagnetic propagation tool; and wherein the estimating comprises subtracting the air signal from a natural log of the ratio to compute an air corrected ratio; and estimating the apparent conductivity from the air corrected ratio.

An eighth embodiment may include any one of the first through seventh embodiments, wherein the ratio is given as follows:

$$\frac{-2H_{zz}}{H_{xx}+H_{yy}};$$

wherein $H_{zz}$ represents an electromagnetic propagation measurement including a coaxial coupling of a z-axis transmitting antenna and a z-axis receiving antenna, $H_{xx}$ represents an electromagnetic propagation measurement including a coplanar coupling of an x-axis transmitting antenna and an x-axis receiving antenna, and $H_{yy}$ represents an electromagnetic propagation measurement including a coplanar coupling of a y-axis transmitting antenna and a y-axis receiving antenna.

A ninth embodiment may include any one of the first through seventh embodiments, wherein the ratio is given as follows:

$$\frac{H_{xx}}{H_{yy}};$$

wherein $H_{xx}$ represents an electromagnetic propagation measurement including a coplanar coupling of an x-axis transmitting antenna and an x-axis receiving antenna and $H_{yy}$ represents an electromagnetic propagation measurement including a coaxial coupling of a y-axis transmitting antenna and a y-axis receiving antenna.

A tenth embodiment may include any one of the first through seventh embodiments, wherein the ratio is given as follows:

$$\frac{H_{zz}+H_{zx}}{H\ +H_{zx}}\cdot\frac{H_{zz}+H_{xz}}{H_{zz}-H_{xz}};$$

wherein $H_{zz}$ represents an electromagnetic propagation measurement including a coaxial coupling of a z-axis transmitting antenna and a z-axis receiving antenna, $H_{zx}$ represents an electromagnetic propagation measurement including a cross coupling of a z-axis transmitting antenna and an x-axis receiving antenna, and $H_{xz}$ represents an electromagnetic propagation measurement including a cross coupling of a z-axis transmitting antenna and a z-axis receiving antenna.

An eleventh embodiment may include any one of the first through seventh embodiments, wherein the ratio is given as follows:

$$\frac{H_{zz}+H_{zx}}{H\ +H_{zx}}\cdot\frac{H_{zz}+H_{xz}}{H_{zz}-H_{xz}};$$

wherein $H_{zz}$ represents an electromagnetic propagation measurement including a coaxial coupling of a z-axis transmitting antenna and a z-axis receiving antenna, $H_{zx}$ represents an electromagnetic propagation measurement including a cross coupling of a z-axis transmitting antenna and an x-axis receiving antenna, and $H_{xz}$ represents an electromagnetic propagation measurement including a cross coupling of a z-axis transmitting antenna and a z-axis receiving antenna.

A twelfth embodiment may include any one of the first through eleventh embodiments, wherein the computing and the estimating is performed downhole using a processor deployed in the electromagnetic propagation tool.

A thirteenth embodiment may include any one of the first through twelfth embodiments, wherein the acquiring comprises rotating the electromagnetic propagation tool in the wellbore; firing the at least one transmitting antenna; and receiving corresponding voltages at the at least one receiving antenna.

In a fourteenth embodiment, a method for estimating a skin-effect apparent conductivity of a subterranean formation comprises acquiring an air signal for an electromagnetic propagation tool; acquiring at least first and second electromagnetic propagation measurements, the first and second electromagnetic propagation measurements made in a wellbore penetrating the subterranean formation using the electromagnetic propagation tool; computing a ratio using the at least first and second electromagnetic propagation measurements; subtracting the air signal from the ratio to obtain an air corrected ratio; computing a phase shift apparent conductivity from an imaginary portion of the air corrected ratio; computing an attenuation apparent conductivity from a real portion of the air corrected ratio; and adding the phase shift apparent conductivity and the attenuation apparent conductivity to estimate the skin-effect corrected apparent conductivity of the subterranean formation.

A fifteenth embodiment may include the fourteenth embodiment, further comprising computing an apparent dielectric constant of the subterranean formation from the attenuation apparent conductivity.

In a sixteenth embodiment, a system comprises an electromagnetic propagation tool configured for making electromagnetic propagation measurements of a subterranean formation, the electromagnetic propagation tool including a processor and at least one transmitting antenna spaced apart by a spacing distance from at least one receiving antenna; wherein the processor is configured to cause the electromagnetic propagation tool to make at least first and second electromagnetic propagation measurements using the at least one transmitting antenna and the at least one receiving antennas; compute a ratio using the at least first and second electromagnetic propagation measurements; and estimate the apparent conductivity of the subterranean formation from the ratio.

A seventeenth embodiment may include the sixteenth embodiment, wherein the spacing distance is greater than 5 meters.

An eighteenth embodiment may include any one of the sixteenth through seventeenth embodiments, wherein the compute the apparent conductivity comprises dividing a logarithm of the ratio by a tool constant of the electromagnetic propagation tool; and the tool constant is proportional to a measurement frequency and to a square of the spacing distance.

A nineteenth embodiment may include any one of the sixteenth through eighteenth embodiments, wherein the processor is further configured to compute a skin-effect corrected apparent conductivity from a sum of an imaginary portion of the ratio and a real portion of the ratio.

A twentieth embodiment may include any one of the sixteenth through nineteenth embodiments, further comprising estimating an apparent dielectric constant of the subterranean formation from an imaginary portion of the ratio.

Although direct determination of formation apparent conductivity from EM propagation measurements has been described in detail, it should be understood that various changes, substitutions and alternations can be made herein without departing from the spirit and scope of the disclosure as defined by the appended claims.

What is claimed is:

1. A method for estimating a complex-valued apparent conductivity of a subterranean formation, the method comprising:

acquiring an air signal for an electromagnetic propagation tool;

acquiring at least first and second electromagnetic propagation measurements, the first and second electromagnetic propagation measurements made in a wellbore penetrating the subterranean formation using the electromagnetic propagation tool including at least one transmitting antenna spaced apart by a spacing distance from at least one receiving antenna;

computing a ratio using the at least first and second electromagnetic propagation measurements; and estimating the complex-valued apparent conductivity from the ratio, the estimating comprising:

subtracting the air signal from a natural log of the ratio to compute an air corrected ratio;

estimating a phase shift apparent conductivity from an imaginary portion of the air corrected ratio; and estimating an attenuation apparent conductivity from a real portion of the air corrected ratio.

2. The method of claim 1, further comprising computing a skin-effect measurement from a sum of the real portion of the ratio and the imaginary portion of the air corrected ratio.

3. The method of claim 1, further comprising computing a skin-effect corrected apparent conductivity from a sum of the phase shift apparent conductivity and the attenuation apparent conductivity.

4. The method of claim 1, further comprising computing an apparent dielectric constant of the subterranean formation from the attenuation apparent conductivity.

5. The method of claim 1, further comprising computing a corresponding attenuation apparent conductivity error or a phase shift apparent conductivity error from at least one of an attenuation measurement error and a phase shift measurement error.

6. The method of claim 1, wherein the ratio is given as follows:

$$\frac{-2H_{zz}}{H_{xx}+H_{yy}};$$

wherein $H_{zz}$ represents an electromagnetic propagation measurement including a coaxial coupling of a z-axis transmitting antenna and a z-axis receiving antenna, $H_{xx}$ represents an electromagnetic propagation measurement including a coplanar coupling of an x-axis transmitting antenna and an x-axis receiving antenna, and $H_{yy}$ represents an electromagnetic propagation measurement including a coplanar coupling of a y-axis transmitting antenna and a y-axis receiving antenna.

7. The method of claim 1, wherein the ratio is given as follows:

$$\frac{H_{xx}}{H_{yy}};$$

wherein $H_{xx}$ represents an electromagnetic propagation measurement including a coplanar coupling of an x-axis transmitting antenna and an x-axis receiving antenna and $H_{yy}$ represents an electromagnetic propagation measurement including a coplanar coupling of a y-axis transmitting antenna and a y-axis receiving antenna.

8. The method of claim 1, wherein the ratio is given as follows:

$$\frac{H_{zz}+H_{zx}}{H_{zz}-H_{zx}}\cdot\frac{H_{zz}-H_{xz}}{H_{zz}+H_{xz}};$$

wherein $H_{zz}$ represents an electromagnetic propagation measurement including a coaxial coupling of a z-axis transmitting antenna and a z-axis receiving antenna, $H_{zx}$ represents an electromagnetic propagation measurement including a cross coupling of a z-axis transmitting antenna and an x-axis receiving antenna, and $H_{xz}$ represents an electromagnetic propagation measurement including a cross coupling of a z-axis transmitting antenna and a z-axis receiving antenna.

9. The method of claim 1, wherein the ratio is given as follows:

$$\frac{H_{zz} - H_{zx}}{H_{zz} + H_{zx}} \cdot \frac{H_{zz} + H_{xz}}{H_{zz} - H_{xz}};$$

wherein $H_{zz}$ represents an electromagnetic propagation measurement including a coaxial coupling of a z-axis transmitting antenna and a z-axis receiving antenna, $H_{zx}$ represents an electromagnetic propagation measurement including a cross coupling of a z-axis transmitting antenna and an x-axis receiving antenna, and $H_{xz}$ represents an electromagnetic propagation measurement including a cross coupling of a z-axis transmitting antenna and a z-axis receiving antenna.

10. The method of claim 1, wherein the computing and the estimating are performed downhole using a processor deployed in the electromagnetic propagation tool.

11. The method of claim 1, wherein the acquiring comprises:

rotating the electromagnetic propagation tool in the wellbore;

firing the at least one transmitting antenna; and receiving corresponding voltages at the at least one receiving antenna.

12. A method for estimating a skin-effect apparent conductivity of a subterranean formation, the method comprising:

acquiring an air signal for an electromagnetic propagation tool;

acquiring at least first and second electromagnetic propagation measurements, the first and second electromagnetic propagation measurements made in a wellbore penetrating the subterranean formation using the electromagnetic propagation tool;

computing a ratio using the at least first and second electromagnetic propagation measurements;

subtracting the air signal from the ratio to obtain an air corrected ratio;

computing a phase shift apparent conductivity from an imaginary portion of the air corrected ratio;

computing an attenuation apparent conductivity from a real portion of the air corrected ratio; and adding the phase shift apparent conductivity and the attenuation apparent conductivity to estimate the skin-effect corrected apparent conductivity of the subterranean formation.

13. The method of claim 12, further comprising computing an apparent dielectric constant of the subterranean formation from the attenuation apparent conductivity.

14. A system comprising:

an electromagnetic propagation tool configured for making electromagnetic propagation measurements of a subterranean formation, the electromagnetic propagation tool including a processor and at least one transmitting antenna spaced apart by a spacing distance from at least one receiving antenna;

the processor configured to:

cause the electromagnetic propagation tool to make at least first and second electromagnetic propagation measurements using the at least one transmitting antenna and the at least one receiving antenna;

compute a ratio using the at least first and second electromagnetic propagation measurements;

estimate an apparent conductivity of the subterranean formation from the ratio, the estimating the apparent conductivity comprising dividing a logarithm of the ratio by a tool constant of the electromagnetic propagation tool, the tool constant being proportional to a measurement frequency and to a square of the spacing distance; and compute a skin-effect corrected apparent conductivity from a sum of an imaginary portion of the ratio and a real portion of the ratio.

15. The system of claim 14, further comprising estimating an apparent dielectric constant of the subterranean formation from a real portion of the ratio.

* * * * *